(12) United States Patent
Schumann et al.

(10) Patent No.: US 6,950,532 B1
(45) Date of Patent: Sep. 27, 2005

(54) VISUAL COPYRIGHT PROTECTION

(75) Inventors: Robert Wilhelm Schumann, Oakton, VA (US); David G. Grossman, Herndon, VA (US); David Glenn DeGroote, Ashburn, VA (US)

(73) Assignee: Cinea Inc., Reston, VA (US)

( * ) Notice: Subject to any disclaimer, the term of this patent is extended or adjusted under 35 U.S.C. 154(b) by 668 days.

(21) Appl. No.: 09/840,054

(22) Filed: Apr. 24, 2001

Related U.S. Application Data

(60) Provisional application No. 60/199,134, filed on Apr. 24, 2000, provisional application No. 60/273,318, filed on Mar. 6, 2001, provisional application No. 60/280,148, filed on Apr. 2, 2001.

(51) Int. Cl.[7] .......................... H04K 1/00; G03B 21/26
(52) U.S. Cl. ........................ 382/100; 353/30; 380/201
(58) Field of Search ................................ 382/100, 232, 382/211; 380/210, 287, 54, 201, 202, 203; 713/176; 386/94, 95; 353/20, 28, 29, 30

(56) References Cited

U.S. PATENT DOCUMENTS

| | | | |
|---|---|---|---|
| 4,949,389 A * | 8/1990 | Allebach et al. ............... 382/31 |
| 5,119,443 A * | 6/1992 | Javidi et al. ................... 382/42 |
| 5,959,717 A * | 9/1999 | Chaum .......................... 352/40 |
| 6,018,374 A * | 1/2000 | Wrobleski ................... 348/744 |
| 6,529,600 B1 * | 3/2003 | Epstein et al. .............. 380/252 |
| 6,624,874 B2 * | 9/2003 | Revelli, Jr. et al. ........... 352/90 |
| 2002/0078357 A1 * | 6/2002 | Bruekers et al. ............ 713/176 |
| 2002/0080271 A1 * | 6/2002 | Eveleens et al. ............ 348/473 |
| 2002/0126871 A1 * | 9/2002 | Hannigan et al. ........... 382/100 |
| 2002/0168069 A1 * | 11/2002 | Tehranchi et al. .......... 380/235 |
| 2003/0012548 A1 * | 1/2003 | Levy et al. .................... 386/46 |

OTHER PUBLICATIONS

Pauly et al., "A Scourge of Video Pirates," *Newsweek*, Jul. 27, 1987, 2 pages.*

"Warning!: Warner Bros. and COBRA Declare War on Video Piracy," advertisement in *Variety*, May 28, 1986, p. 73.*

U.S. Appl. No. 09/592,472, filed Jun. 2000, Burstyn et al.
U.S. Appl. No. 09/679,320, filed Oct. 5, 2000, Burstyn.

* cited by examiner

*Primary Examiner*—Andrew W. Johns
(74) *Attorney, Agent, or Firm*—David G. Grossman

(57) ABSTRACT

A visual copyright protection system is disclosed, including input content, a disruption processor, and output content. The disruption processor inserts disruptive content to the input content creating output content that impedes the ability of optical recording devices to make useful copies of output content.

45 Claims, 24 Drawing Sheets

| 1,1 | | | ••• | | | m,1 |
|---|---|---|---|---|---|---|
| | 2,2 | | ••• | | | |
| | | 3,3 | ••• | | | |
| ⋮ | ⋮ | ⋮ | ⋮ | ⋮ | ⋮ | ⋮ |
| | | | ••• | m-2,n-2 | | |
| | | | ••• | | m-1,n-1 | |
| 1,n | | | ••• | | | m,n |

VISUAL COPYRIGHT PROTECTION

CROSS-REFERENCE TO RELATED APPLICATION

The present application claims the benefit of priority to provisional patent applications: Ser. No. 60/199,134 to Robert Wilhelm Schumann and David G. Grossman, filed on Apr. 24, 2000, entitled "Visual Copyright Protection," which is hereby incorporated by reference; Ser. No. 60/273,318 to Robert Wilhelm Schumann and David G. Grossman, filed on Mar. 6, 2001, entitled "Visual Copyright Protection," which is hereby incorporated by reference; and Serial No. 60/280,148 to Robert Wilhelm Schumann, David G. Grossman and David Glen DeGroote, filed on Apr. 2, 2001, entitled "Visual Copyright Protection," which is hereby incorporated by reference.

BACKGROUND OF THE INVENTION

The present invention relates generally to the field of visual copyright protection. More specifically, the present invention relates to the generation of optical signals that impede the ability of recording devices to make copies of the content.

It is a known problem that pirates videotape content for which they have no rights such as movies, concerts, and proprietary events. Often, copies of these recordings are sold for profit by the pirates or distributed for free (for example, over the internet), depriving revenue to the rightful owners of the content. To date, no methods and apparatuses have been commercially utilized to protect this content from being effectively recorded.

The following terms are useful in discussing visual image generation and disruption.

UV—Ultraviolet light whose frequency is greater than or equal to 0.200 nm and less than or equal to 0.400 um.

VIS—Visible light whose frequency is greater than or equal to 0.400 nm and less than or equal to 0.700 um.

NIR—Near infrared light whose frequency is greater than or equal to 0.700 nm and less than or equal to 1.400 um.

NVIS—Non visible light whose frequency is less than 0.400 um or greater than 0.700 um.

Content—Any optical information created for presentation to either a human eye or recording device.

IRD—Any image recording device capable of recording single or multiple optical images such as a camcorder, digital camera, or film camera.

IGD—Any image generating device capable of generating an optical image including film projectors, monitors, displays, spot lights, and other lighting devices. Some technologies used by IGD's may include LCD's, MEM's, IDLA's, and optical irises.

One previously discussed solution involves blasting a movie theater audience with a constant source of infrared light. This blasted light has such intensity that it washes out the visible light in any image recorded by an IRD. A serious drawback to this solution is that IRDs may be fitted with infrared filters to filter out this constant infrared signal.

There is sufficient evidence in the prior art that solving piracy of content is a serious issue. A series of patents have addressed the problem of preventing video reproduction through the modification of electronic video signals. Other patents address the issue of preventing the copying of paper based and photographic content. Further, several patents deal with the issue of limiting access to multimedia content. Other patents deal with adding watermarks to content to later prove that copying has taken place. All of this prior art is trying to solve the serious problem of illegal piracy of content. There is still a need to solve the serious problem of piracy of content such as movies in theaters, live performances, and protected areas by IRDs and other electronic image detecting devices.

U.S. Pat. No. 3,963,865, entitled "Anti-Piracy Method and System" to Songer discloses a method and system for eliminating or deterring the unauthorized duplication or piracy of video program material, including video tape, cable and broadcast television material. Songer's patent does not address the parallel problem of eliminating or deterring the unauthorized duplication or piracy of optical program material, including movie presentations in theaters, presentations of live content such as concerts, or pieces of art on display in museums. Songer '865 attempts to thwart piracy by encoding a composite video signal when recording content. The encoding method allows normal playback of the content on televisions, but prevents the content from being effectively rerecorded or duplicated on commercial recorders by distorting the recording and thereby destroying its commercial value. Similarly, an optical system to thwart piracy is needed whereby the optical content may be viewed normally when first presented but prevents the content from being effectively rerecorded or duplicated on commercial recorders by distorting the recording and thereby destroying its commercial value.

U.S. Pat. No. 4,631,603 entitled "Method and Apparatus for Processing a Video Signal so as to Prohibit the Making of Acceptable Video Tape Recordings Thereof" to Ryan discloses an invention which modifies a video signal so that a television receiver will still provide a normal color picture from the modified video signal while a videotape recording of the modified video signal produces generally unacceptable pictures. Like the Songer patent, this patent evidences the need for protecting content from pirates. The present invention also addresses the need to protect content from pirates. The Ryan patent seeks to prevent pirates from copying video content through hard wiring copying methods. The present invention prevents pirates from copying displayed content optically using IRDs.

An example of a device which attempts to limit access to copyrighted content is disclosed in U.S. Pat. No. 5,907,656 entitled "Apparatus and Method for Reproducing Video Signals with Varying-Magnitude AGC Signals" to Oguro. This patent disclosed a signal format and compatible reproducing apparatus which uses the disclosed signal format to protect the copyright of recorded video and audio data against dubbing. This patent requires that both the signal and the hardware used to duplicate the copyrighted content be compliant with the system disclosed. Needed is a copy protection scheme which is independent from compliant hardware on the part of the pirate.

U.S. Pat. No. 5,680,454 entitled "Method and System for Anti-Piracy Using Frame Rate Dithering" to Mead discloses a method and system of displaying an image sequence containing a plurality of image frames to inhibit an unauthorized duplication thereby by a camera by varying the frame rate in dependence upon a pseudo-random noise sequence about a nominal frame rate. This patent attempts to prevent pirates from duplicating a displayed sequence by slightly modifying the frame rate of the displayed sequence, thus making it difficult for the pirates' IRD to synchronize with the displayed sequence. This method may not work with new IRDs whose electronics are much more sophisticated and are capable of synchronizing automatically to slightly varying frame rates. In post-processing the resultant luminescence change is also easily removable using modern video editing tools. Also pseudo random changes in frequency may be easily perceived by humans. In addition, this method affects the displayed image globally, not allowing for selective modifications of an image where effects are most likely to be advantageous. Further, this patent does not disclose a system that may prevent the recording of live performances or protected areas.

Needed is a way to protect content from unauthorized, high quality copying by IRDs, while minimizing human perceivable defects. Such a system should prevent a modern IRD or other types of electronic optical detection systems from recording optically displayed images in whole and in part, and similarly prevent the recording of live performances or protected areas.

SUMMARY AND ADVANTAGES OF THE INVENTION

One advantage of the invention is that it generates visual images that impede the ability of recording devices to make copies of generated visual images.

Another advantage of this invention is that it may generate content specific disruptions.

Another advantage of this invention is that it may be implemented using a variety of different projection and display systems, including systems used with prerecorded and live content.

Yet a further advantage of this invention is that it may protect both analog and digital content.

To achieve the foregoing and other advantages, in accordance with all of the invention as embodied and broadly described herein, a method for visual copyright protection comprising the steps of inputting light from a light source, selecting a disruptive light modulating pattern based upon a criterion, the criterion being how the pattern is perceived by an IRD and a human differently, modulating a light array having at least one element using the disruptive light modulating pattern, projecting the light onto the light array producing a modulated light beam, and outputting the modulated light beam. The light array may comprise a multitude of light arrays.

The criterion may further include selecting the pattern for the purposes such as inserting a watermark, inserting a human perceivable image, inserting a non-human perceivable image, creating disruption effects, or creating disruption effects containing motion. The criterion as well as disruption patterns may be inputted from an external source or based upon a dynamic analysis of source content.

In a further aspect of the invention, the method for visual copyright protection may further include the step of projecting the modulated light beam onto a surface. The surface may be an image bearing surface. The modulated light beam may also be focused near the surface. The surface may be utilized by a projector.

In a further aspect of the invention, the method for visual copyright protection may illuminate an area with the modulated light beam.

In a further aspect of the invention, the disruptive light modulating patterns may modulate each element differently. Disruptive light modulating patterns may be provided from an external source and may be a multitude of disruptive light modulating patterns;

In yet a further aspect of the invention, the method for visual copyright protection may further including the steps of: receiving an input image, and combining the input image with the disruptive light modulating pattern. The disruptive light modulating pattern may be a multitude of sequenced disruptive light modulating patterns.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serves to explain the principles of the invention.

FIG. 12 is a block diagram of an aspect of the present invention showing a light switch array.

DETAILED DESCRIPTION OF THE INVENTION

Figure 1:
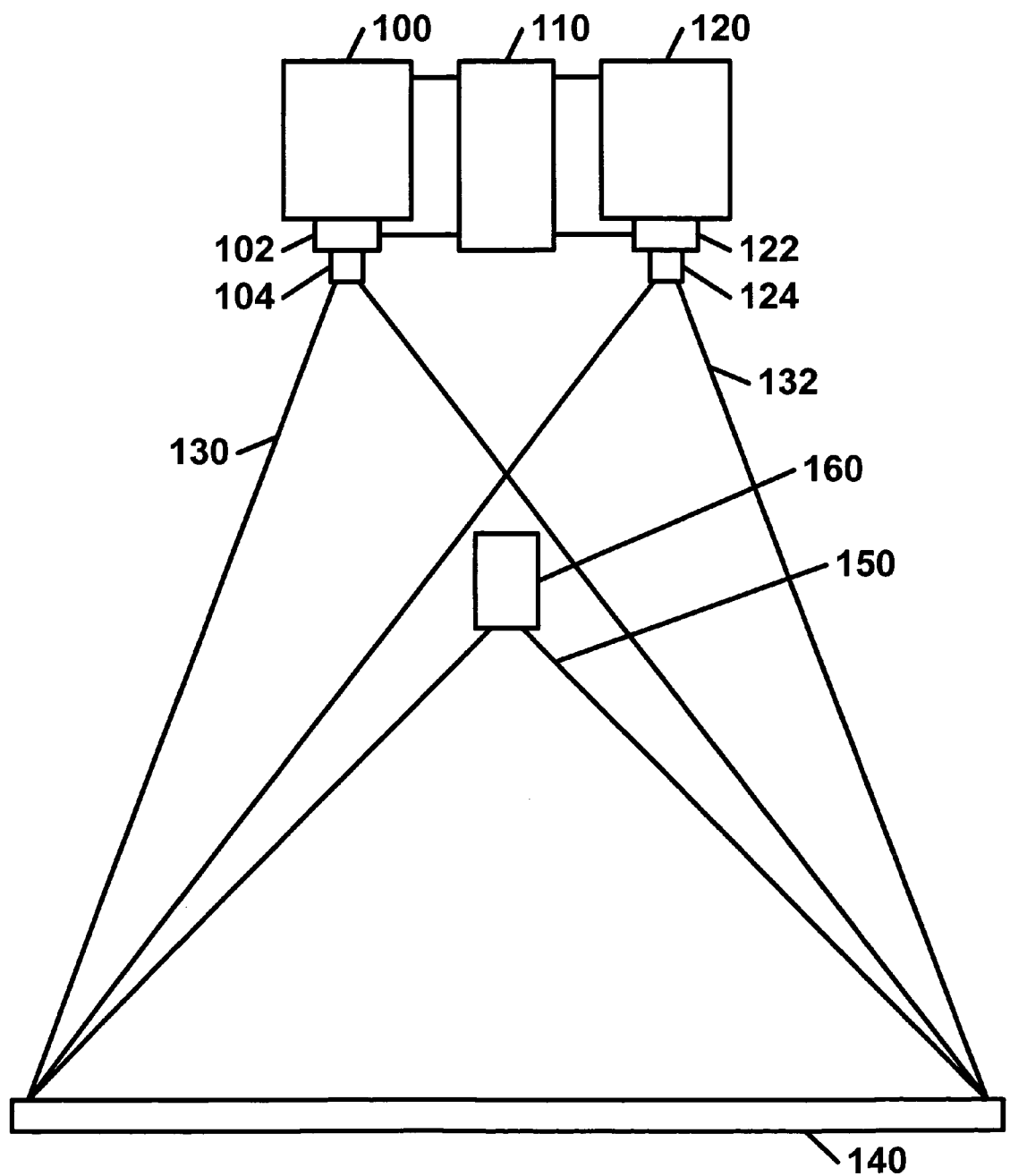
FIG. 1 is a block diagram of an aspect of the present invention utilizing two projectors.

The present invention solves a long-standing problem of pirates making illegal copies of visual images. The present invention solves this problem by generating optical effects that may be invisible to humans but may also be difficult for an IRD to record. Generating these optical effects may be done by taking advantage of differences between a human's ability to see and perceive an image and the ability of an IRD to record the same.

Multiple techniques may be combined or utilized individually to produce images that are difficult to record. A first disruptive technique includes creating signals that are invisible to the human eye, but are visible to an IRD, wherein the IRD records the projected signals as images in the visible spectrum. Imaging sensors, within IRD's, typically break their signal into a few individual signals such as red, green and blue; or cyan, magenta and yellow. Display systems are designed so that these discrete signals when viewed together produce a full spectrum of colors. However, the image sensors often include in the individual signals, energy from NVIS signals. This energy from the NVIS signals may ultimately become visible during recording and subsequent image reconstruction.

Some disruptive techniques may be directed to disrupting the operations of the IRD, including sets of command signals to the imaging devices such as IRDs. For example IRD's with command signal receiving ports may be commanded to operate in a manner contrary to recording the content. Typically, such command signals are NIR signals, but may include any NVIS, VIS, or radio frequency signals.

Another technique to disrupt the operations of the IRD may involve including NVIS or VIS signals to confuse the auto-focus of an IRD. Further techniques may include using NVIS signals to confuse the imaging devices exposure means, causing under and overexposed images. Varying the intensity of these signals may cause constant variation in the final recording.

Yet another way of disrupting the IRD's ability to record an accurate copy of an image may include varying the timing of the displayed image. Many IRD's use sensors that have electronic, or mechanical, shutters that operate at various rates. The IRD's may also have electronics that generate output images around standard frame rates. Producing images that are basically incompatible with the timing of the IRD may result in anomalous images. For example, producing an image whose timing is off may produce beat frequencies that are visible as scrolling bars, image blotches, etc. This effect may also be generated by introducing an image interrupter, such as an independent shutter, into a normal projector that may be synchronous or asynchronous to the frame speed of the content projection. Running the interrupter at a rate different than the video scanning rates, may also generate anomalies such as attenuated areas across the IRD's output image. The timing of generated content may be modified over time to cause undesirable variations in the image on many different IRD's that may have different characteristics. This shutter effect may be predetermined to maximize the attack on each of the many IRD's available for use by content pirates. A disrupter able to generate a shutter effect may be inserted at almost any position in a projected light path. For example, one may insert the disrupter between a lamp and a projector, or between a projector and a projector lens.

Depending upon the IGD technology used, the timing variations introduced to generate beating effects may occur on different blocking structures such as lines, columns, circles, or pixels. And further, the timing variations may be introduced through high or low frequency beat components, potentially in conjunction with the display capabilities of the IGD.

The effective response time of some display technologies may be improved by combining display elements. In these embodiments, it may be possible to switch the elements on and off quickly and accurately, although their latency may be high.

Yet another method for generating a disruption effect includes inserting spaced marks into the generated image that are spaced so as to coincide with the spacing of the image elements on the image sensing devices optical sensors. When the spacing is some percentage off from the image elements spacing, interference patterns, sometimes known as moiré patterns, may be produced in the recorded image. An image element may include a single pixel, a group of pixels or an image frame. A generated image may include any modulated image generated by any IGD including a projector, a projector lamp, or a spot light.

Disruption content may have a multitude of new content including but not limited to images with anomalies, black frames, random patterns, intensity variations, and other predetermined patters such as moiré patterns. If the generated images are of a reduced intensity, the human eye may not detect them. However, because of the timing of the imaging device, the generated images may be captured and reconstructed for much longer periods of time, creating anomalous images.

In an environment where display content is generated using subframes, the present invention may generate images using a higher rate where displayed content is time-multiplexed with disruption content. The disruption content may become visible when played after being processed by an IRD due to temporal expansion facilitated by timing differences between the IRD and IGD.

Additionally, separately generated frames may be projected. Each additional frame may add new content and effects. For example, such a system may be implemented using a multi projector system. The resultant effect may be the sum of each of the separate effects.

Implementing the present invention in environments where human visible images are generated by pulse width modulation techniques, such as in a DLP based projector, disruption techniques may be generated by using different pulse width modulation patterns both spatially among different pixels within a frame, as well as temporally for the same pixel in different display frames. Note that these techniques can also be combined.

Images produced by the disclosed techniques may distort current images, or create new ones. In the case of producing new images, those images may include but are not limited to text or logos identifying the content as copyright protected. Further, the content may also include identifying information or watermarks such as but not limited to location and time of the event being recorded.

In some instances, it may be desirable to use the present invention to generate human perceivable visual images. Such images may be used to mark the content with messages such as "test showing", "proof", "sample", "copy protected", or the like. This same capability may also be used to customize presentations such as advertisements. A generic advertisement in the content may be modified to present a local message to an audience during display.

The present invention may also be utilized in conjunction with standard film projectors, LCD based projectors, D-ILA based projectors, with Digital MEMS projectors, or any other light projecting or modifying apparatus. A disrupter as described may also be used in multiple modes. For example, the disrupter may be used as a disruptive light source to a conventional projector in one mode and as a discrete digital projector in another mode. In other words, we may have a digital projector that may also be used as a disruptive light source for other IGD's such as a conventional film projector In this case the combined units may share common elements such as projection lenses, power supplies, cooling, and mechanical mounting.

An interlock to automatically enable these techniques when an electronic digital content security system exists may be included as part of the system to ensure that the content may only be generated utilizing anti-copying measures. The electronic digital content security system may, for example, be used synchronously with live, film, or digital based content.

An example of a disruption pattern which can be generated may include a stripping effect where alternate high speed source frames have interleaved data being displayed. The IRD records all or portions of the stripped frames, while the human viewer observes a continuous image.

Another example of disruption patterns may include: a message display where a visible message (i.e. "COPY") is displayed using techniques disclosed herein; and generating a localized disruption which may obscure the highest value portion of the image such as a star's face. The disrupter may have an external data source which directs where and how to disrupt the content based on specific characteristics of the content. Such an external data source may be synchronized with the content being displayed. For example, in a film based embodiment, the synchronizing information may be carried in the sound track area of the film, or timing information may be carried on the film for synchronizing with externally provided disruption directives. These externally provided disruption directives may be delivered through any standard electronic delivery mechanism such as modem connections, internet connections, hard media, or satellite. Correspondingly, in a full digital version, this information may also be in the control stream, or carried in the actual digital film data itself, whether compressed or uncompressed. The control information may determine characteristics of the disruption such as the area or zone of the frame to be disrupted and which effect to produce in that zone. The localized disruption may be pre-authored or dynamically calculated.

Additionally, effects may be feathered in around their edges. Feathering may have the advantage of avoiding sharp discontinuities that may become visible to the naked eye.

The disruptive effects may be optimized based to the particular content being displayed at any particular time. Any type of disruptive effect may be optimized to the content including playback flicker frequency, moirés, and moving patterns such as waves. For example, an effect that is especially effective on a blue sky may be applied to only blue skies and not the ground below. The time that different disruptive effects are invoke may also be selectively chosen based on various criterion such as the emotional level of the content or the visual intensity of the content. In addition, the location of the effect may be optimized to the content. For example, the effects may be directed to the central focal point of the content and avoided in peripheral areas.

Disruptive effects may include both discrete effects visible within individual images as well as dynamic effects over a multitude of images. These dynamic effects may be comprised of a series of effects on discrete images such that when viewed in a continuous fashion cause additional disruption. For example, a flickering bar could be shifted slowly to distract the attention of a viewer from the underlying image. Other dynamic disruption effects could include spinning alternate wheels, and adjacent shifting vertical bars where one bar is moving up and the other bar is moving down.

In a live performance embodiment, these changes may be controlled dynamically either by a transponder on stage or by a director. In addition, the disrupter may be used to replace visible content. In this way, content may be customized for uses such as advertising.

In some instances, it may be desired to provede ant-piracy lighting effects to "protected areas." Such areas may include museums or high security locations where there is a desire to prevent pictures from being taken. Entire rooms or specific areas may be targeted by the present invention. Objects in settings such as museums may have individual lighting to protect them, whereas a reception area may have full room lighting effects.

To compensate for a decrease in intensity that may occur by implementing some of these techniques (particularly within existing film based projection systems), the luminance of a projector may be increased and then the effective duty cycle of the projected frames may be decreased by a similar amount so that the average luminance is unaffected. The content data average may be the average intensity of the content data. The display data average may be the average intensity of the display data. Preferably, the content data average will be equivalent to the display data average. One skilled in the art will recognize that other techniques may also be used to control intensity including controlling the density of content such as on film prints.

By implementing a multitude of disruptive mechanisms, an increased degree of protection may be created. Several of these mechanisms may be "switched" in and out over time to confuse the IRD's and pirates. In addition, both visible and invisible effects may be "switched" in and out over time, allowing completely visible effects to be presented. Hence, only one of the disruptive mechanisms needs to work to achieve the stated goal of IRD's from recording high quality images.

Reference will now be made in detail to the presently preferred embodiments of the invention, examples of which are illustrated in the accompanying drawings.

Referring now to FIG. 1, we see a system with a controller 110 that is controlling two projectors, a first projector 100 and a second projector 120. Projector 100 has a shutter 102 and a lens 104. Projector 120 has a shutter 122 and a lens 124. Controller 110 controls the shutters 102 and 122. The two projectors project images synchronously with each other. The first projector 100 produces image beam 130 and the second projector 120 produces image beam 132. Image beams 130 and 132 are reflected off screen 140 as a composite beam 540. IRD 160 then receives the composite image 540. In the illustrated example, a first projector 100 is preferably projecting regular content while the second projector 120 may be projecting disruptive content. Alternatively, controller 110 may only control the second projector 120 based on synchronization information from the first projector 100. It this case the controller 110 is not controlling the first projector 100. Lamps in the two projectors may produce light of different frequencies to assist in generating a disruptive effect. The disruptive content may include: variously timed signals; nonvisible light signals; locally disruptive signals that may be directed to particular parts of the image, or the entire image. This embodiment may also generate subtitles. The original images may be generated by a multitude of sources including film, and digital distributions.

Figure 2:
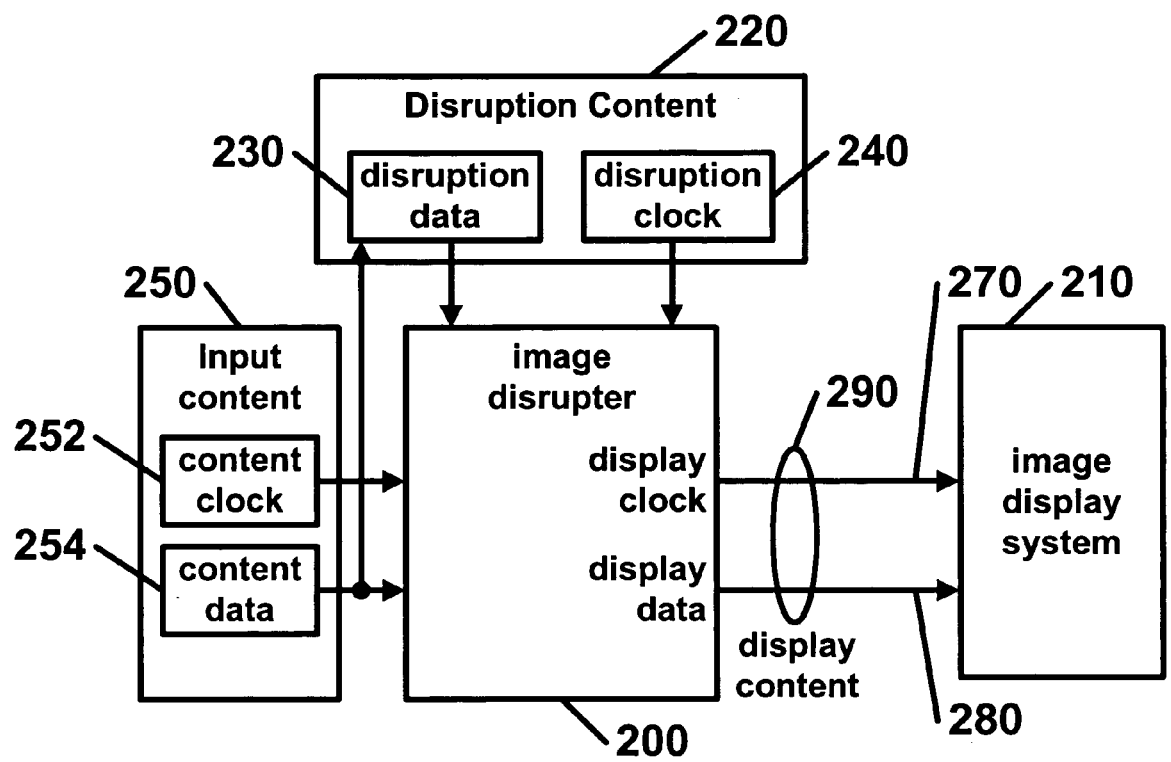
FIG. 2 is a block diagram of an aspect of the present invention showing a disrupter system.

FIG. 2, is a block diagram of a disruption processor system as per an embodiment of the present invention. A disruption processor 200 processes and disrupts the input content 250. Input content 250 is input to the disruption processor 200 and may include content data 254 and/or a content clock 252. Disruption content 220 may also be input into the disruption processor 200 and may include disruption data 230 and/or a disruption clock 240. A multitude of means including optical or electrical means may provide content or information to the image disrupter 200. The disruption processor may process the input content 250 from its original content clock rate to a new display rate using the disruption clock 240 and the disruption data 230. The disruption processor 200 preferably introduces disruption components as specified by the disruption data 230 into the output signal as disruptive effects. The output signal may include a display clock 270 and/or display data 280, and is preferably output to a light array 210. An image display system 210 may include but is not limited to a MEM's display device, an LCD display device, a CRT display device, a light projector, or an artificial eyelid device. The resultant image that is displayed on the image display system 210 preferably looks normal to the human eye, but may contain anomalies that appear in the recorded image. Some of the disruption components are preferably selected to interfere with the normal shutter speed, scan rate, or low frequency (approximately 50 to 60 Hz.) synchronization circuitry of the input sensor of an IRD trying to record the content as described earlier.

The implementation described in FIG. 2 may be realized, for example, using DMD technology from Texas Instruments of Dallas Tex. This technology uses a modulated reflection of a continuous light source using an array of high-speed movable mirrors to modulate the light output for a source frame element to the correct luminance for that frame. The reflected output may be used as a light source to a conventional projector, or as a direct image source itself. In this system, the display frame rate is typically a much higher frame rate than a conventional source frame rate of 30 HZ. Currently the high-speed frame generation systems provide a very uniform modulation of the image. In fact, much work has been done to make images as even and smooth as possible. For example, U.S. Pat. No. 5,619,228 entitled "Method for reducing temporal artifacts in digital video systems" by Doherty discloses a method and system for improving display of digital video data. The present invention specifically modifies the standard modulation algorithms to introduce frequency patterns which may cause anomalous images to be recorded by IRD's.

Figure 3:
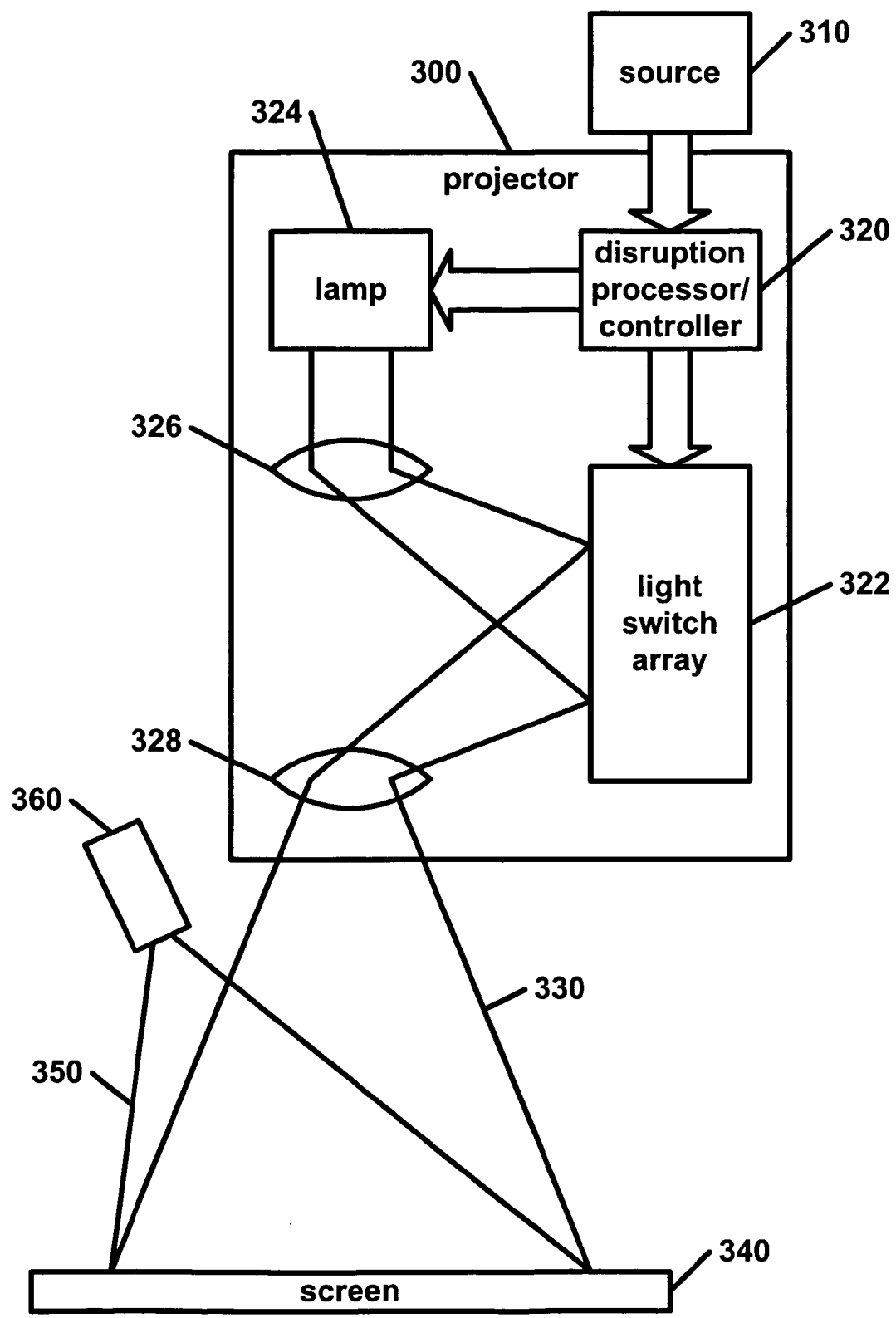
FIG. 3 is a block diagram of an aspect of the present invention showing a disrupter projection system.

FIG. 3 illustrates a projector 300 built as per an embodiment of the present invention. Input to the projector 300 is source data 310. Source data 310 may originate from the content media or from other external sources. The source data 310 is processed by a disruption processor/controller 320. One output of the disruption processor/controller 320 may control a lamp 324. The other output of the disruption processor/controller 320 may control a light switch array 322. The light switch array 322 which may include a digital DMD device, an LCD, or other type of manipulating array. Light from the lamp 324 is projected through a first Optics 326 which reflect the beam onto the light switch array 322. Preferably, the light switch array manipulates the light on a pixel-by-pixel basis at a higher rate than the source frame rate and reflects the resultant image to optics 328 where a main image beam 320 is projected onto a screen 340. An IRD 360 receives a reflected beam 350 reflected from screen 340 or other illuminated space. The embodiment illustrated in FIG. 3 may have uses including a disruptive spotlight, a lamp source for a still or moving projector, a lighting system, or a self-contained image projection system.

Figure 4:
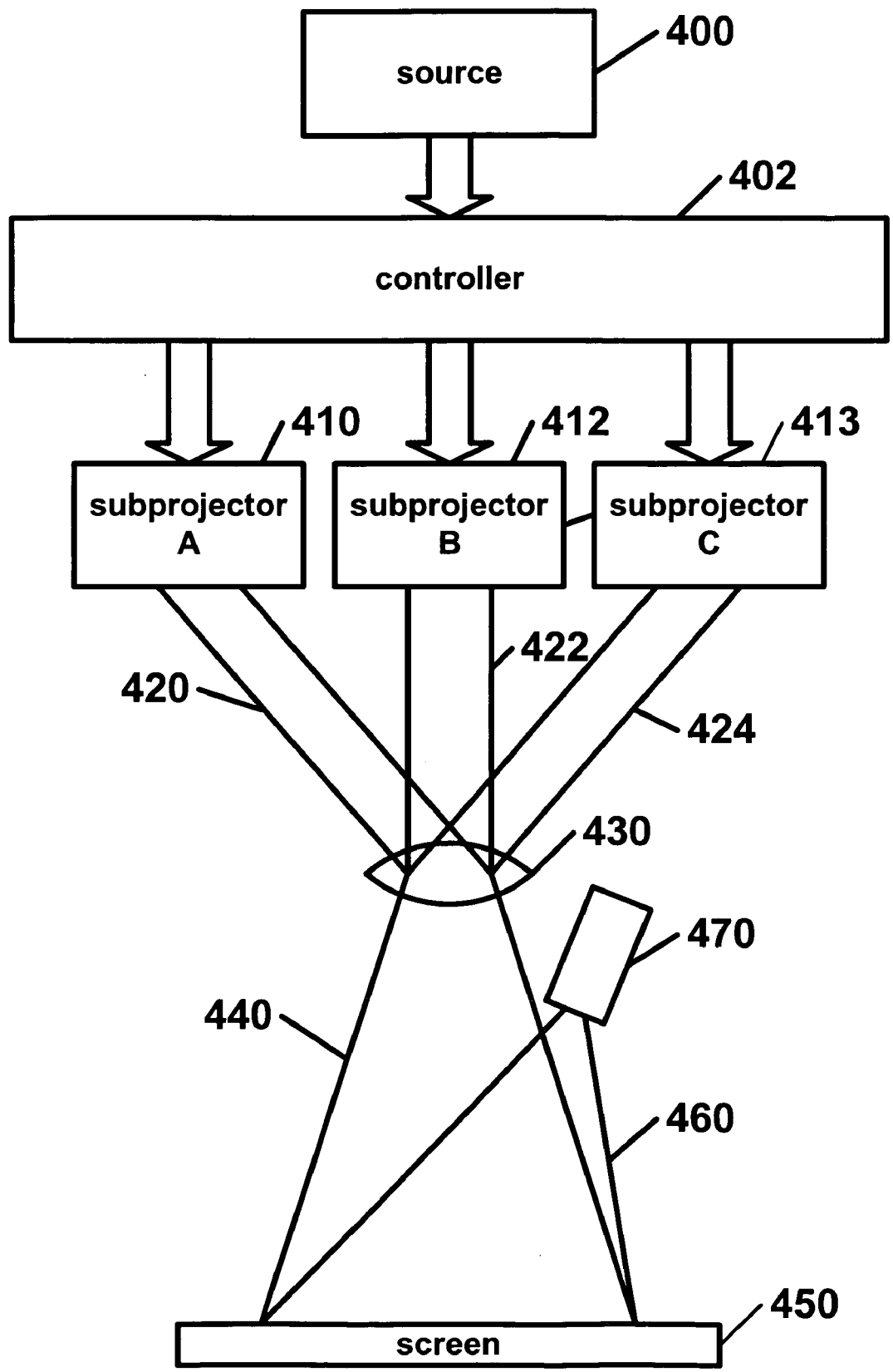
FIG. 4 is a block diagram of an aspect of the present invention showing a disrupter projection system including a multitude of subprojectors.

FIG. 4 shows a projection system demonstrating the combined use of a multitude of projectors. The content source 400 is input into a controller 402. The controller then controls three subprojectors: subprojector A 400; subprojector B 412; and subprojector C 413. Subprojector A 410 produces an image beam 420, subprojector B 412 produces an image beam 422, and sub projector C produces an image beam 424. The three image beams 420, 422, and 424 may be combined in optics device 430 into a single image beam 440 which may be reflected off of a screen 450 and received by an image sensor 470. Each of the subprojectors preferably work in unison to produce a series of images that when combined by the optics device 430 contain disruptive signals directed to the imaging device 470. These disruptive signals may be generated in either one or all of the subprojectors. Examples of this type of system that may be modified to implement embodiments of the present invention include the ELM G10 and ELM R12 projectors by Barco located in the Netherlands which use multiple DMD chips from Texas Instruments, where each chip modulates one of Red, Green and Blue portions of the image.

Figure 5:
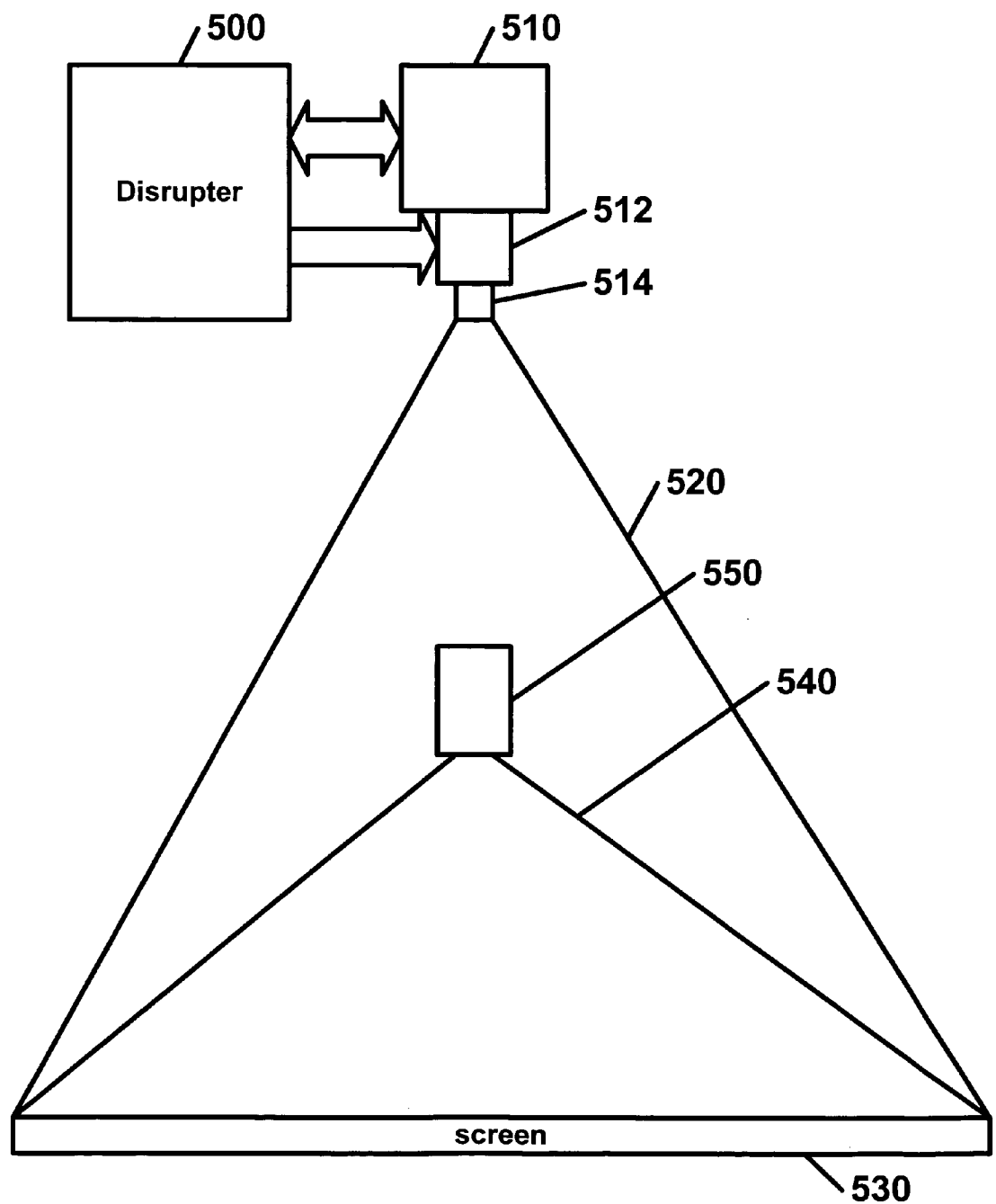
FIG. 5 is a block diagram of an aspect of the present invention showing an image disrupter system including a disruption shutter.

FIG. 5 illustrates another aspect of the invention. In this example, a traditional projector 510 is fitted with a disruption shutter 512 and a lens 514. A disrupter device 500 may control the disruption shutter 512 and the projector. The disruption shutters may include devices such as traditional shutters, LCD shutters, or artificial eyelids and may shutter a complete image or just a portion of the image. A key feature of these disruption shutters, relative to this invention, is that they are capable of operating at a rate in excess of the human visual perception rate of 60–80 HZ. The projector may project image beam 520 onto screen 530. An IRD 550 may then receive reflected beam 540 from screen 530. This embodiment could be used as a spotlight in a museum to protect items on display from being photographed.

Figure 6:
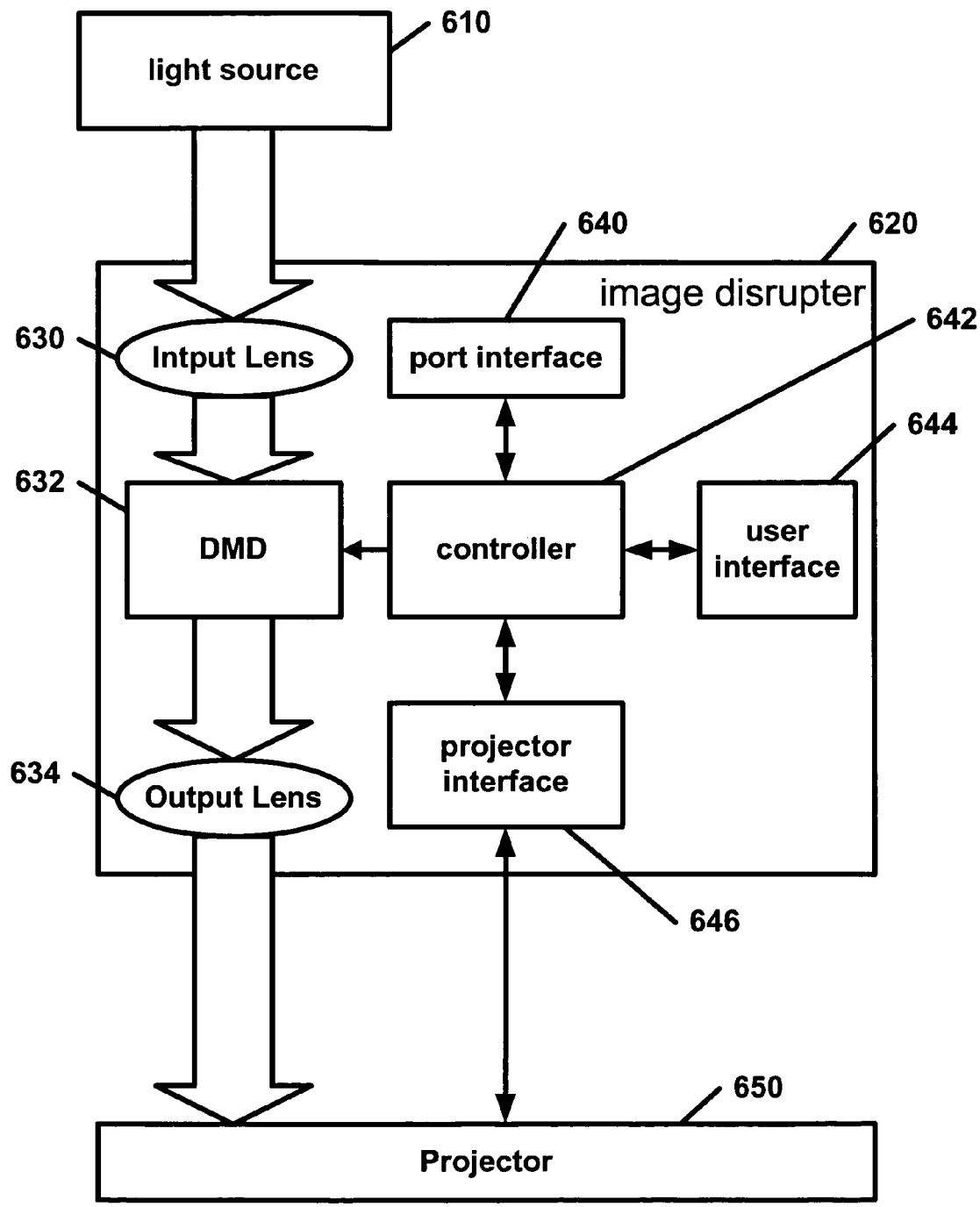
FIG. 6 is a block diagram of an aspect of the present invention showing an image disrupter between a light source and a projector.

FIG. 6 is a block diagram of an aspect of the present invention showing an image disrupter 620 between a light source 610 and a projector 650. Light source 610 generates light that may project through an input lens 630 and onto a DMD. The input lens 630 preferably collimates the light beam. The DMD may be an array of mirrors, wherein each mirror in the array may be independently steered. Each of the mirrors preferably reflects a portion of the light beam either through the output lens 634 or into a light sink. The light source 610 may be the light sink. The portion of the light beam reflected through the output lens 634 may be used as the light source for the projector 650. Controller 642 may drive the DMD 632 (and each of the DMD mirrors). As illustrated in FIG. 6, the controller 642 may also interface with update ports logic 640, a user interface 644, and a projector interface 646. The user interface 644 may allow a user of the system to select operational options such as which disruptive effects to perform. Conversely the disruptive effects may be controlled based on information received from the projector interface 646, or from the external port interface 640. A projector interface 646 allows information to pass between the disrupter 620 and the projector 650. The information may include frame synchronizing information, content location information, or control and disruption information encoded on the content media. The port interface 640 may update operational tables and logic in the controller.

Figure 7:
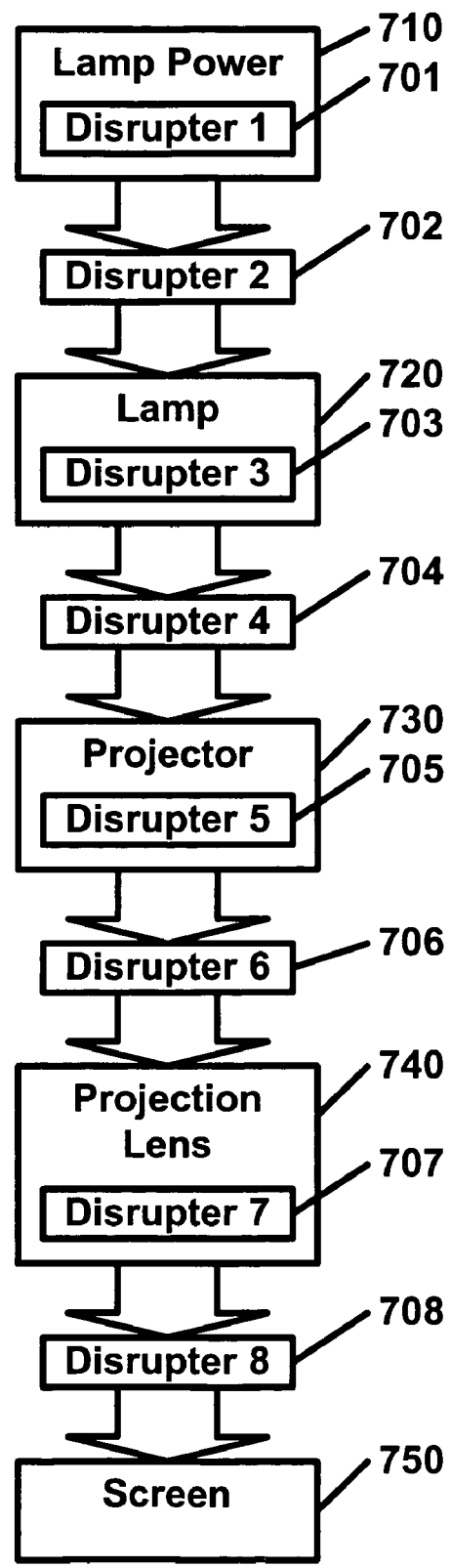
FIG. 7 is a block diagram showing possible locations for a disrupter in a projection system.

FIG. 7 is a block diagram showing possible locations for a disrupter in a projection system. As illustrated, any number of disrupters may be utilized in a system, either independently or collectively to cause disruptions to the optical beam. A typical projection system includes a lamp power supply 710, a lamp 720, a projector 730, a projection lens 740, and a screen 750. Modulation may include any method that results in the varying of the intensity of an optical source or signal with time. The modulation may further include any method that results in the switching on or off an optical source or signal with time. The only requirement to successfully practice the present invention is that at least one disrupter be utilized somewhere in a system to disrupt the final output.

Disrupter 1 701 may be integrally located in the lamp power supply 710 and generate disruptive effects by modulating the lamp source through the output of the lamp power supply 710. Disrupter 2 702 may modulate the light power between the lamp power source 702 and the lamp 720. This location preferably may have the same effect as modulating the lamp power in the lamp power supply 710. The lamp 720 may also contain a disrupter 3 703. This disrupter may use various means to control the output of the lamp 720, including modulating the supply or producing an optical interference with the lamps output. Means for generating optical interference may include any number of optical shutters known in the art. Disrupter 4 704 may be located between the lamp 720 and the projector 730. This disrupter 4 704 may further disrupt the projected image by modifying the lamps light beam into a disrupted light beam before it reaches the projector 730. Disrupter 5 705 may be located internal to the projector to disrupt the optical beam either before or after the content is introduced into the optical beam. Disrupter 6 706 may be positioned between the projector 730 and the projection lens 740 to disrupt the optical beam after content is introduced into the optical beam but before the optical beam is focused for the screen 750. The projection lens 740 may be any suitable lens for facilitating the projection of the optical beam coming from the projector 730 for display on the screen 750. This lens assembly may include disrupter 7 707 to disrupt the optical beam. A disrupter 8 708 may be placed external to the projection lens to generate a disruption of the projection optical beam. This location may be extremely convenient when it is difficult to install a disrupter in any of the previously discussed locations.

One skilled in the art will recognize that optical signals may be disrupted at any point in an optical system, including locations not shown in this diagram. The point being that there are numerous places from the initial generation of a light source until a final light beam reaches a recording sensor that a disruption effect may be inserted. Using a disrupter in secondary image sources that simultaneously display images upon the screen 750 may even create disruption effects.

Figure 8:
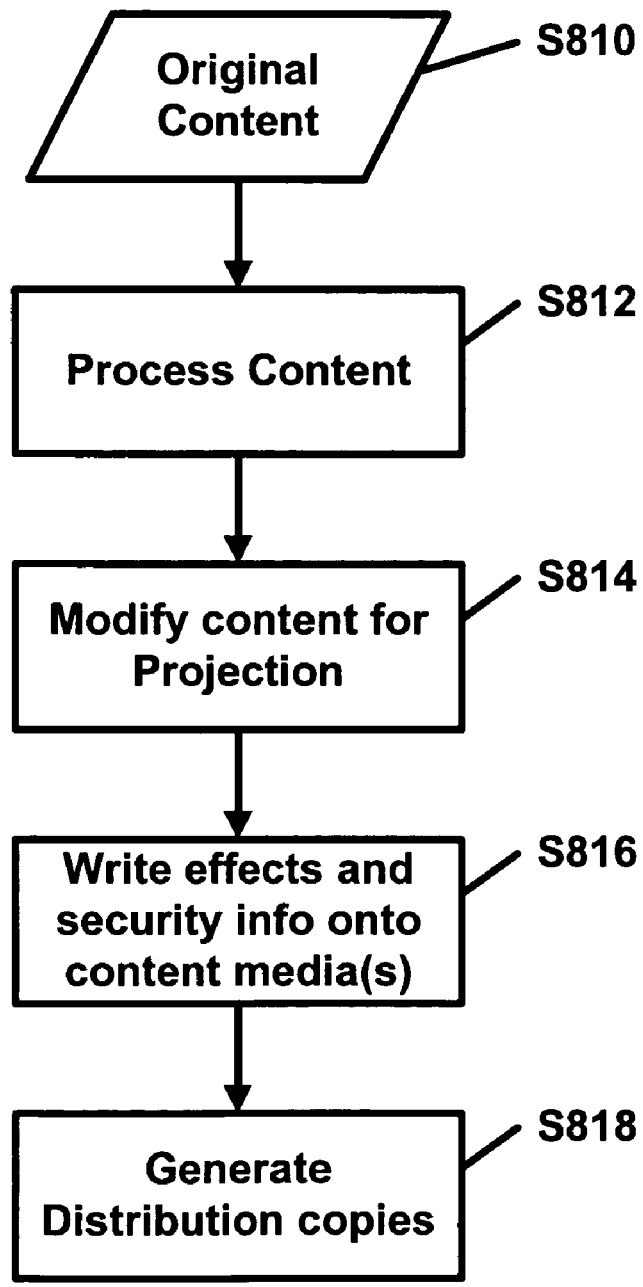
FIG. 8 is a flow diagram showing possible content processing steps.

To maximize disruption effects, it may be advantageous to preprocess the content. FIG. 8 is a flow diagram showing possible content processing steps. The flow starts at step S810 with some original content. Step S812 processes the original content. The processing at this step may include analyzing the original content to determine optimal locations and disruption techniques to use throughout the content. The disruption techniques and data may be generated for a variety of independent disruption mechanisms. These independent disruption mechanisms may include protections for a variety of IRD's. Next at step S814, the content may undergo specific modifications based on the analysis made during the processing step S812. The content may also undergo generic modifications to whole frames at this step. For example, the content may be "overexposed" for the whole or part a frame. The content maybe separated and modified based on color. These modifications may assist in the presentation of effects at display time. At step S816, the process may add effects and security information to the content media. The disrupter may interpret and act upon the effects and security information. This information may further include security measures to assure that content is only displayed where and when it was intended for display or to synchronize effects to the presentation of the content. The processed content may be stored and distributed on multiple independent media. An example includes encrypting effect data so that only specific projectors may properly show the content. On a film based system, the audio may be independently encrypted and delivered on an independent media, thus enhancing security. The final step S818 illustrated in FIG. 8 is to generate copies of the content for distribution.

Figure 9:
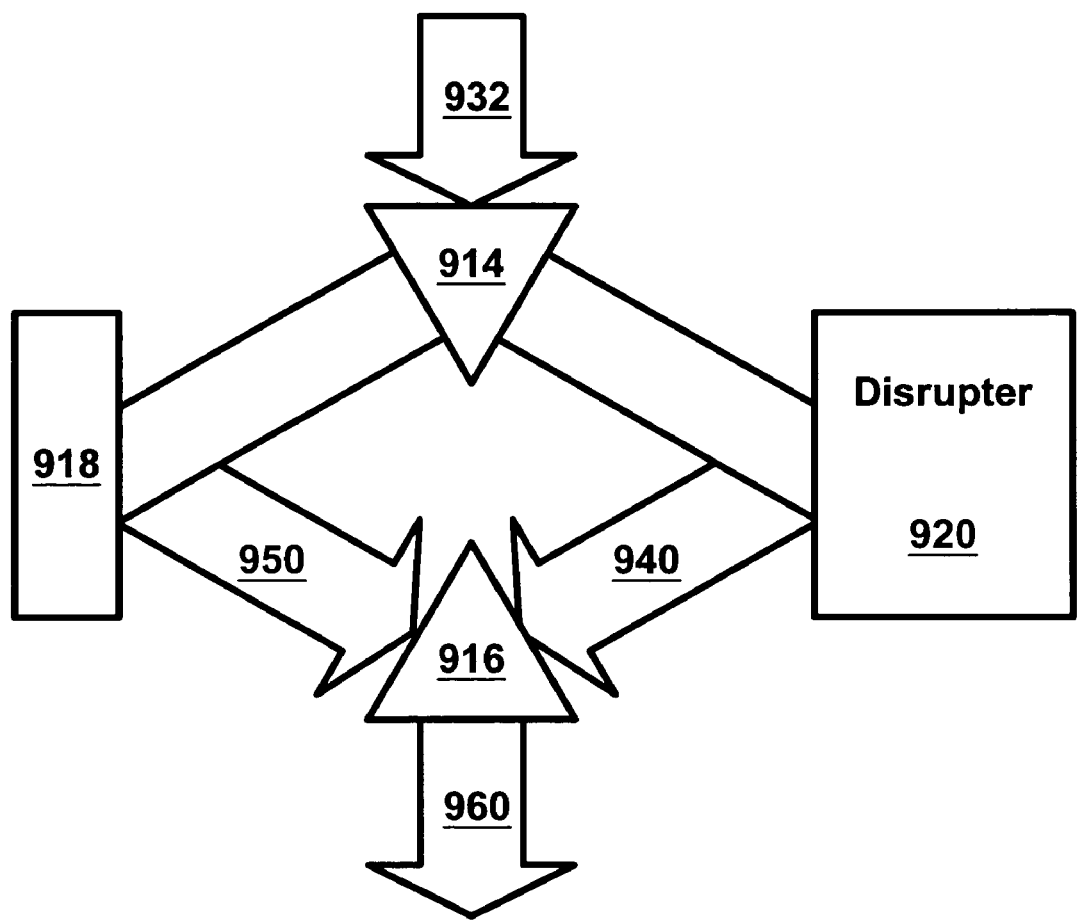
FIG. 9 is a block diagram of an aspect of the present invention showing a split light path.

In some embodiments of the present invention, it may be helpful to modify only part of the optical beam. For example, one may wish to minimize the attenuation of the final projection. The block diagram in FIG. 9 shows how it may be possible to split, disrupt, and then recombine an optical beam. Optical splitter 914 may split optical beam 932 into two different beams with similar or dissimilar (i.e. blue and red split) content. A first optical beam 950 may travel to an optical combiner 916 undisrupted. The path followed by optical beam 950 may include reflection by at least one mirror 918 or modification by optics (not shown). The path followed by optical beam 940 may include being disrupted by at least one disrupter 920 or modified by optics (not shown). It may be important that the optical delay is relatively equal for both the disrupted beam 940 and the undisrupted beam 950. Optical combiner 916 combines the separate optical beams 950 and 940 into a combined optical beam 960. This combined optical beam may now include some disrupted content. For example, optical splitter 914 may split content by color, using a device such as a prism, such that only blue content is sent to disruptor 920 and all other content is not modified. Further splitter 914 could also split all wavelengths equivalently (either temporally or continuosly, such that each split beam is a percentage of the total beam. In another example, the splitter 914 could split the content spatially such that disrupter 920 modifies only the selected area before the content is recombined.

Figure 10:
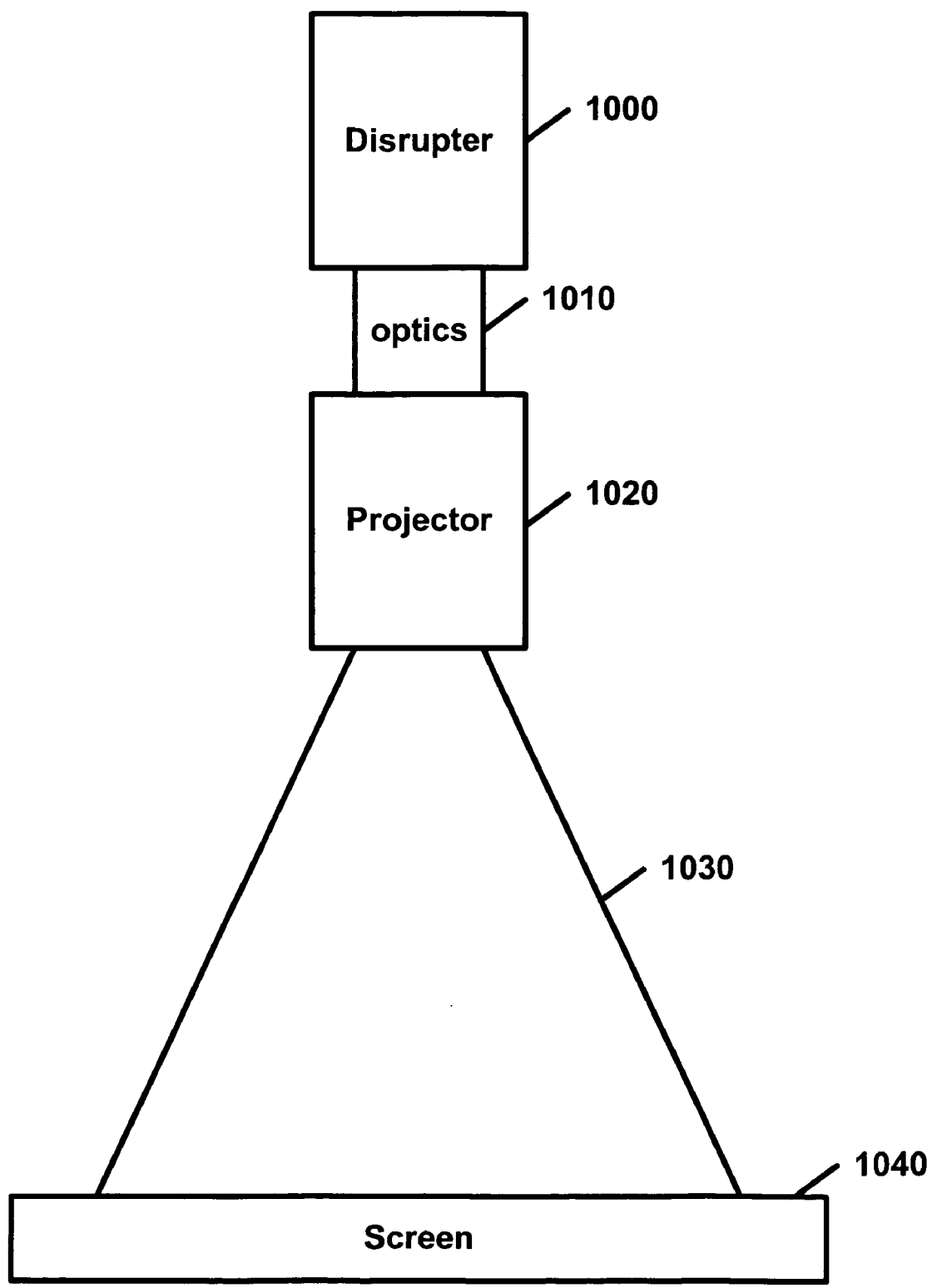
FIG. 10 is a block diagram of an aspect of the present invention showing a disrupter feeding a projector.

It is possible to add a disrupter as per the present invention to a conventional film projector as shown in FIG. 10. A disrupter lamp source 1000 may replace the lamp source of the conventional projector. The disrupted light beam emanating from the disrupter lamp source 1000 is preferably focused by optics 1010 onto the back of the film in conventional projector 1020. The projector may operate in a usual mode to project an image beam 1030 which contains a disrupted copy of the film content onto a screen 1040.

Figure 11:
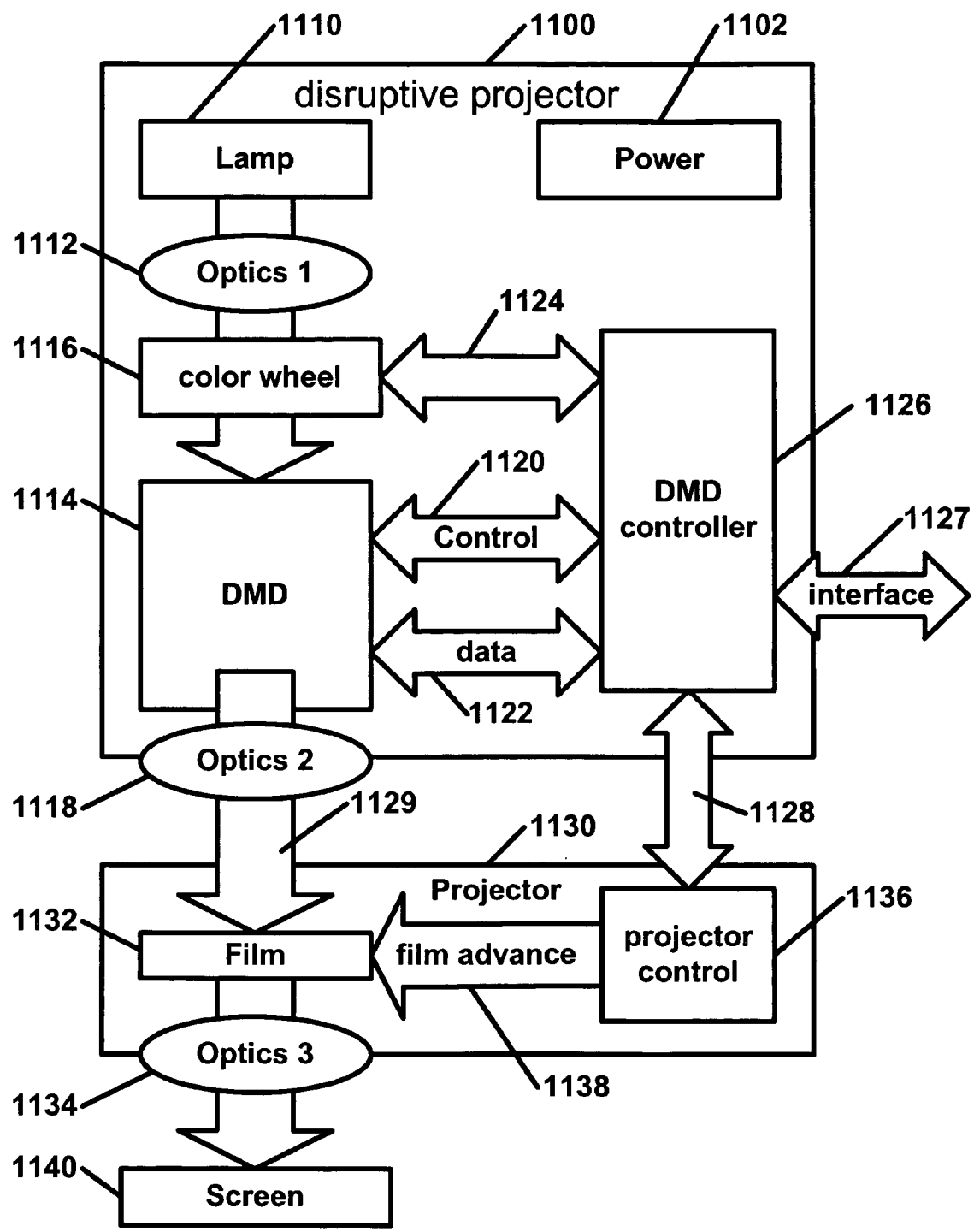
FIG. 11 is a block diagram of an aspect of the present invention showing a disrupter and projector in combination.

FIG. 11 illustrates a disruptive projector system using a disruptive projector in combination with a conventional projector. In this embodiment, the disruptive projector 1100 generates a disruptive light source for a conventional projector 1130. A lamp 1110 generates a light source which may be focused on the DMD 1114 by optics 1 1112 through an optional color wheel 1116. The color wheel 1116 may be any type of light filtering device. A DMD controller 1126 may control the DMD 1114 using control signals 1120 and data signals 1122. A power source 1102 may provide power for the disruptive projector 1100. Each of the DMD mirrors on the DMD chip 1114 preferably reflects light from the lamp 1110 to either the optics 2 1118 or back into the lamp 1110. The data signals 1122 may include mirror position data for the mirrors on the DMD chip 1114. The control signals enable the DMD chip to accept the position data and to position the mirrors.

The light beam 1129 which is reflected from the DMD chip 1114 intended for the conventional projector 1130 may be focused by optics 2 1118 onto the plane of the film 1132 in the projector 1130. In some embodiments, it may be desireable to soft focus light beam 1129 (focus the beam near the plane) to minimize visibility of the effects, in the displayed image, to the human visual system. It may be advantageous to automate the optics focusing. The light beam 1129 then travels through film 1132 and is preferably focused on a screen 1140 by optics 3 1134. The image projected on the screen may now contain a composite of the disrupted light source and the image on the film.

When a color wheel 1116 is used, the DMD controller 1126 may produce disruptive effects that are color specific by synchronizing the disruptive effects with the wheel. The DMD controller 1126 may control the color wheel 1116 and obtain position information about the color wheel 1116 through wheel control lines 1124. By generating the disruption effects at varying levels during the times when the light source is projecting through specific sections of the color wheel 1116, the output effects may become color specific. In some disruptive projectors as per the present invention, the DMD 1114 may include multiple light arrays. Color effects may then be generated simply by segregating the effects to the discrete DMD's.

The disruption effect generated by the disruptive projector 1100 may either work in synch with the shutter in the conventional projector 1100 or simulate the shutter itself. Typically, a shutter on a conventional projector 1130 has a defined blackout period during which there is film advancement by a film advance mechanism 1138 and also a matching blackout period evenly spaced with the advancement blackout period to minimize flicker. The DMD controller may then introduce disruptive effects during the remainder of the cycle. The projection control 1136 may communicate the shutter closing times to the DMD controller 1126 over an inter projector communications line 1128. Data coming over the projector data communication line 1128 may include other data, for example, audio data, lamp control data, film tracking, film identification, focus, and power.

External interface 1127 may provide disruption instructions for use in the presentation of content. This interface 1127 may be unidirectional to input the instructions or bi-directional to allow interactive instructions.

This novel configuration of utilizing a disruption/digital projector with a conventional (i.e. film) projector illustrated in FIG. 11 may operate in a multitude of configurations. When no film is present in the conventional projector 1130, it may be used as a digital projector with or without disruption. When there is film present in the conventional projector 1130, it may be used as a combination or film projector with or without disruption. In this configuration, data from the interface 1127 may provide operational information. This information may include instructions, data, images, and disruption data.

Figure 12:
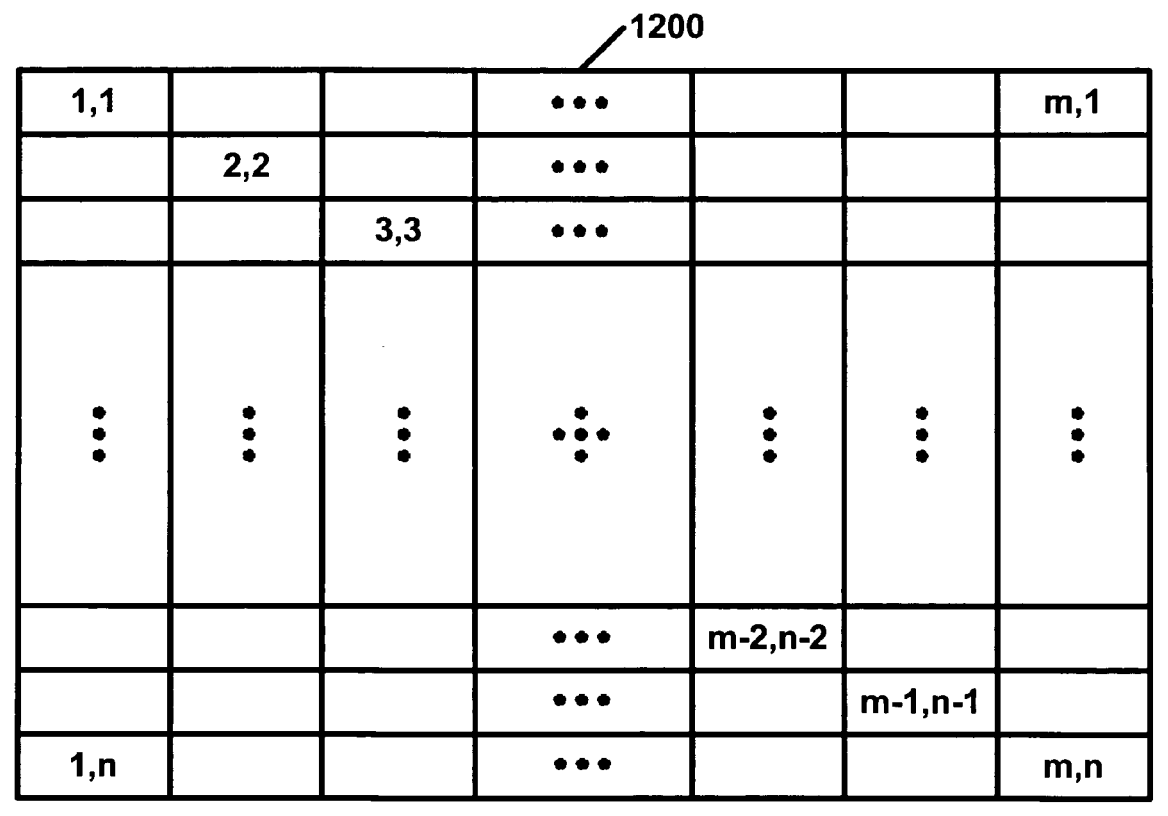

FIG. 12 shows light array 1200. The light array 1200 illustrates a two-dimensional array consisting of a multitude of elements. The elements are located at the intersections of two axis's creating rows and columns. The identity of each element may be the intersection of the row and column that it intersects. For example, element 1,1 is located at the intersection of row 1, column 1. Element (1,n) is located at the intersection of column 1 and row n. Element (m,n) is located at the intersection of column m and row n. One skilled in the art will recognize that other combinations of array elements may be possible including the use of more than two dimensions.

Figure 13:
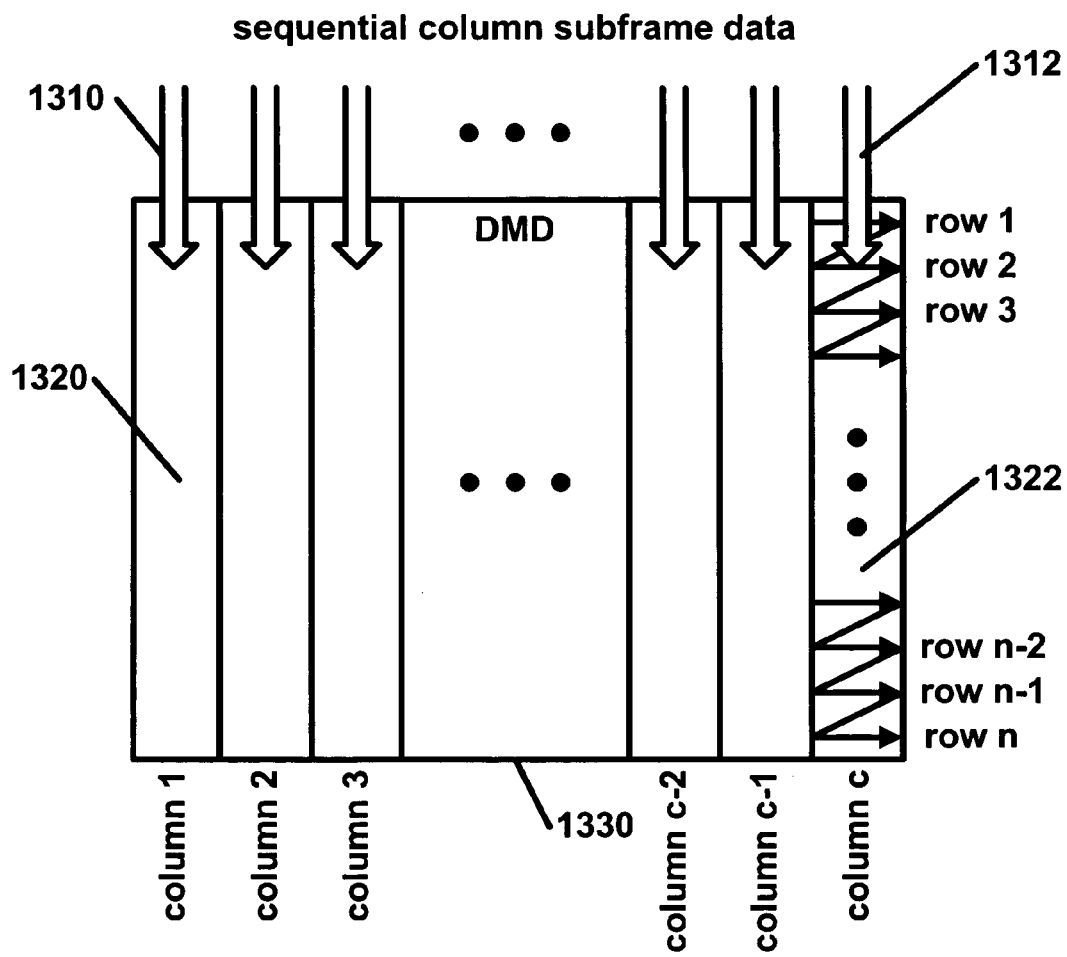
FIG. 13 is a block diagram of an aspect of the present invention showing DMD data loading.

The present invention may be practiced using a DMD MEMs light array device manufactured by Texas Instruments of Dallas, Tex. and found in the Kodak DP800 projector marketed by the Eastman Kodak Corporation in Rochester, N.Y. Each element of this device is a discrete mirror that may be independently steered creating (m×n) possible discrete disruption zones. FIG. 13 illustrates a DMD device. To control the discrete mirrors, this device requires loading column and row position data for the mirrors. Data may be loaded into the device as sequential 16 pixel wide column data. The sequential column data for column 1 1310 through column n 1312 is loaded independently for column 1 1320 through column c 1322.

Figure 14:
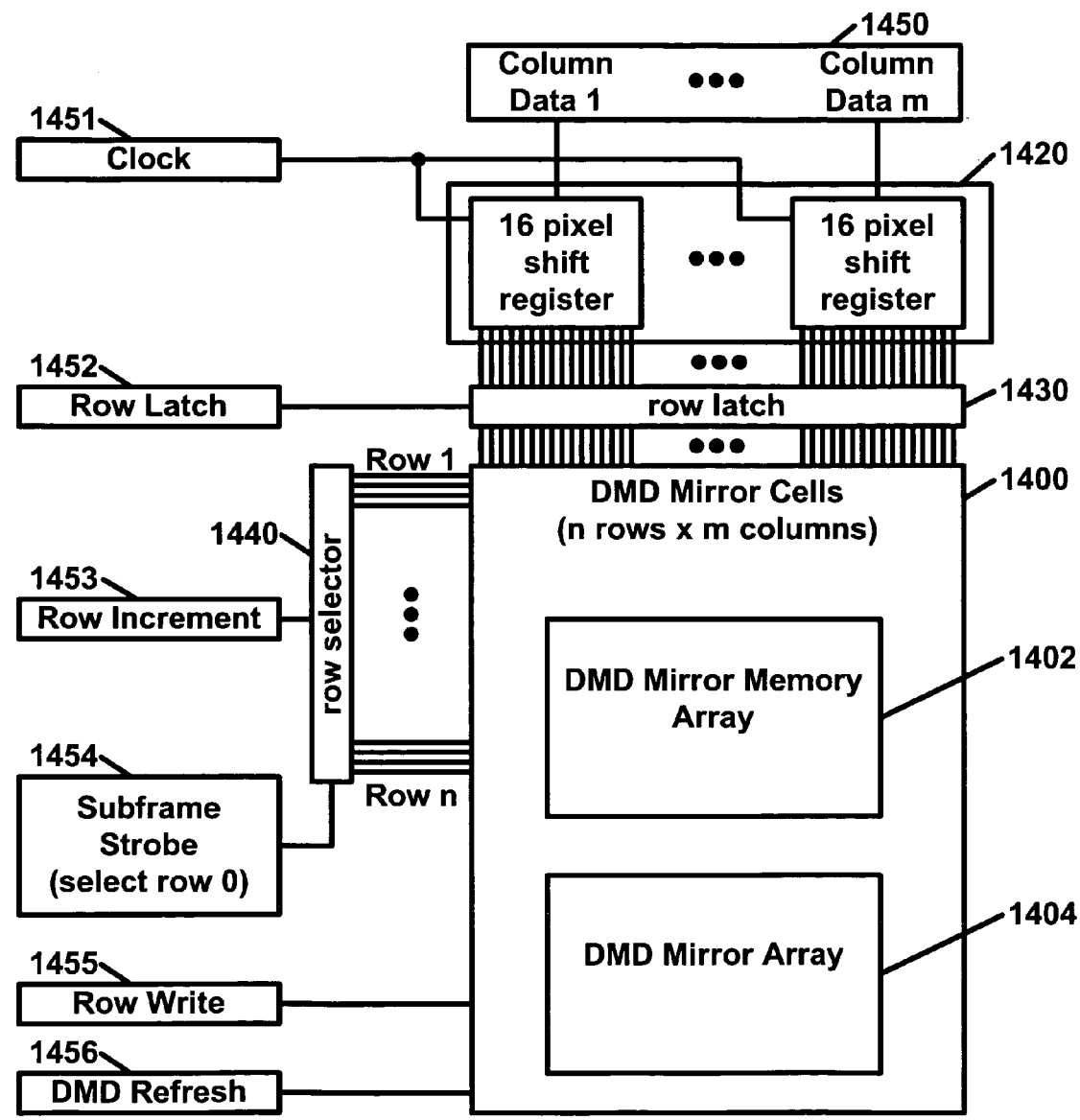
FIG. 14 is a block diagram of an aspect of the present invention showing a DMD device.
Figure 15:
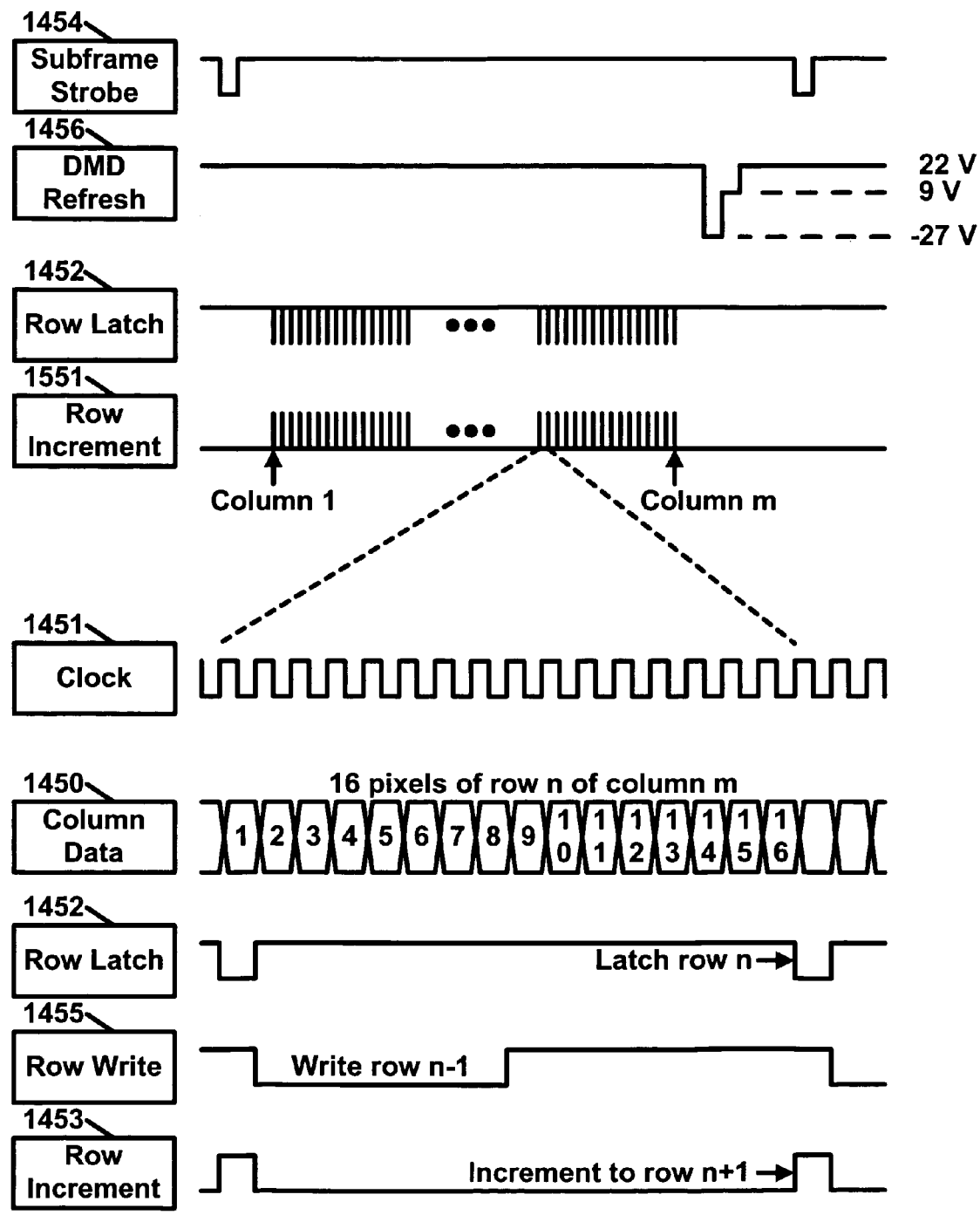
FIG. 15 is a timing diagram of an aspect of the present invention showing signals used in loading DMD data.

FIG. 14 is a block diagram showing more details of the DMD device. FIG. 15 is a timing diagram showing a possible operational sequence to operate the DMD device. The DMD may have DMD mirror cells 1400 that include a DMD mirror array 1404 and a DMD mirror memory array 1402. Preferably, there is a one-to-one relationship between the DMD mirror array 1404 and the DMD mirror memory array 1402. Serialized Column data 1450 is clocked into a row latch 1430 through a multitude of shift registers 1420, one shift register for each column by clock 1451. The shift registers convert the serialized column data to parallel form for loading into a DMD mirror memory array 1402. Asserting row latch signal 1452 preferably causes the data in the shift register 1420 to be stored in row latch 1430. Asserting row write 1455 may cause the data in row latch 1430 to be stored in a row of DMD mirror memory cells determined by row selector 1440. Asserting subframe strobe 1454 may reset row selector 1440 to zero. Likewise the row selector 1440 may be incremented by a row incrementer 1453 signal. Finally, the data in the DMD mirror memory array 1402 may be used to position the mirrors in the DMD mirror array 1404 by assertation of a DMD refresh signal 1456.

Figure 16:
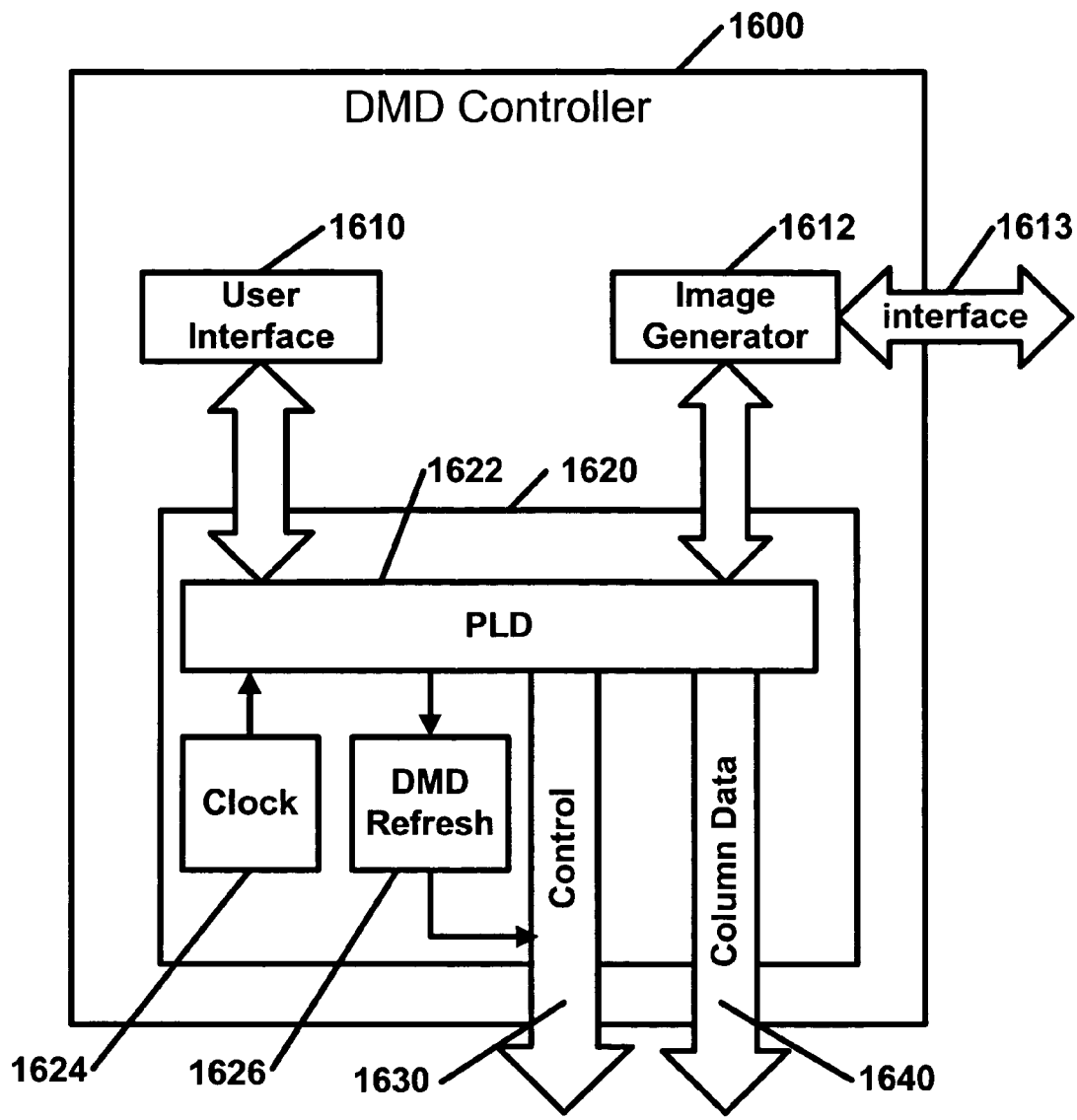
FIG. 16 is a block diagram of an aspect of the present invention showing a DMD controller.

As illustrated in FIG. 16, DMD controller logic 1600 may drive the DMD chip (not shown). The DMD controller 1600 may include a user interface 1610, an image generator 1612, a programmable logic device (PLD) 1622, a clock circuit 1624, and a DMD refresh signal generator 1626. The output of the DMD controller logic 1600 may include control signals 1630, and column data 1640. The PLD may implement logic to generate signals such as those signals disclosed in FIGS. 14 and 15 for output to a DMD chip. This embodiment may require DMD refresh logic 1626 to produce a tri-level DMD refresh signal. The clock logic 1624 generates a master clock for the DMD controller 1600. The rate of this clock may vary depending upon the disruption effect required. Image generator 1612 may provide image data or image effect data for the system. In some embodiments, the output of the image generator 1612 may include the final content. In other embodiments, the output of the image generator 1612 may only include disruption data. In yet further embodiments, the data may include disrupted output content. Data for the image generator 1612 may be provided from external sources over interface 1613.

Figure 17:
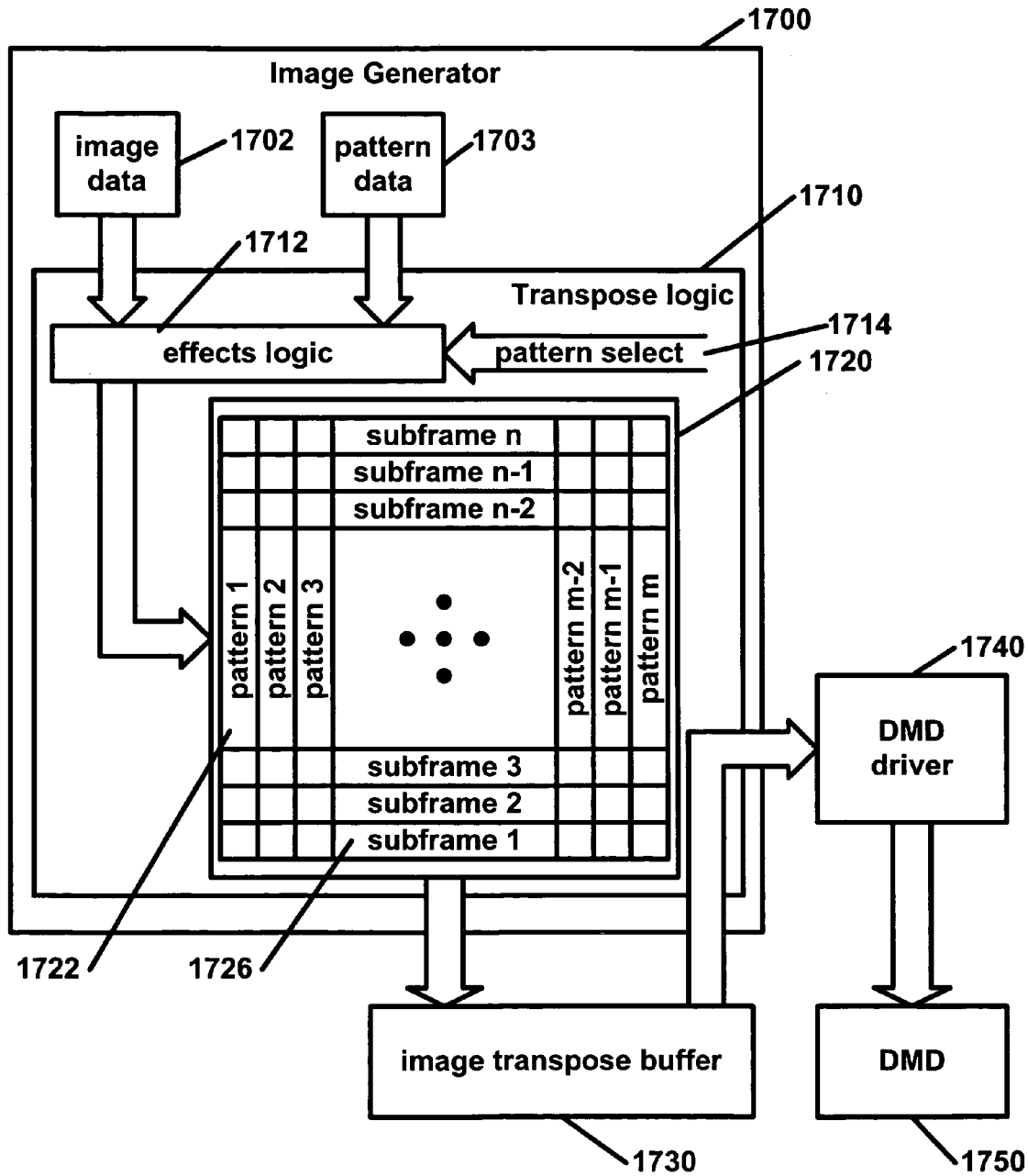
FIG. 17 is a block diagram of an aspect of the present invention showing a image generator using image transpose logic.

FIG. 17 is a block diagram of an aspect of the present invention showing an image generator 1700. The image generator 1700 starts with image data 1702 and/or pattern data 1703 which that may be internally generated, externally generated, preproduced, or dynamically produced. The image data 1702 may be encoded or unencoded display data with varying frame rates. The pattern data 1703 may likewise be encoded or unencoded disruption data with varying frame rates. The image data 1702 and/or the pattern data 1703 may further be pixel specific data or block specific data. The display rate may be varied independently for any pixel or block.

Examples of pattern data 1703 may include sprites or fonts. Image data 1702 and pattern data 1703 may be input into effects logic 1712. The effects logic 1712 preferably converts the display data to a time specific effect pattern (hereinafter referred to as 'pattern') determined by a pattern selection 1714. Preferably, the effects logic 1712 may be a simple lookup table or a more complex logic subsystem. The pattern outputted includes data to specify the DMD mirror positions over a multitude of subframes. A subframe may be a single frame in a multitude of frames that are intended to be displayed as a sequential group. One skilled in the art will recognize that the use of subframes is not the only way to output pattern data but merely a discrete example of a means for generating such a pattern. Further, there may be no requirement to use conventional frames. In this case each pixel or group of pixels may be changed at any time independent of the rest of the image. This may allow for localized effect areas in the image able to produce independent effects. In some embodiments, either the image data 1702 or the pattern data 1703 may be null.

The pattern is loaded into image transpose logic 1720 along a first logical axis 1722 sequentially. The subframes may then be extracted along a second logical axis 1726. This procedure of writing patterns and extracting subframes transposes the patterns into subframes in a form that is usable by the DMD driver 1740. It may often be convenient to store the subframe output in an image transpose buffer 1730 before feeding the subframes into the DMD driver 1740 which will drive the DMD 1750. The transpose buffer 1730 may provide timing relief between the DMD driver 1740 and the transpose logic 1710.

Figure 18:
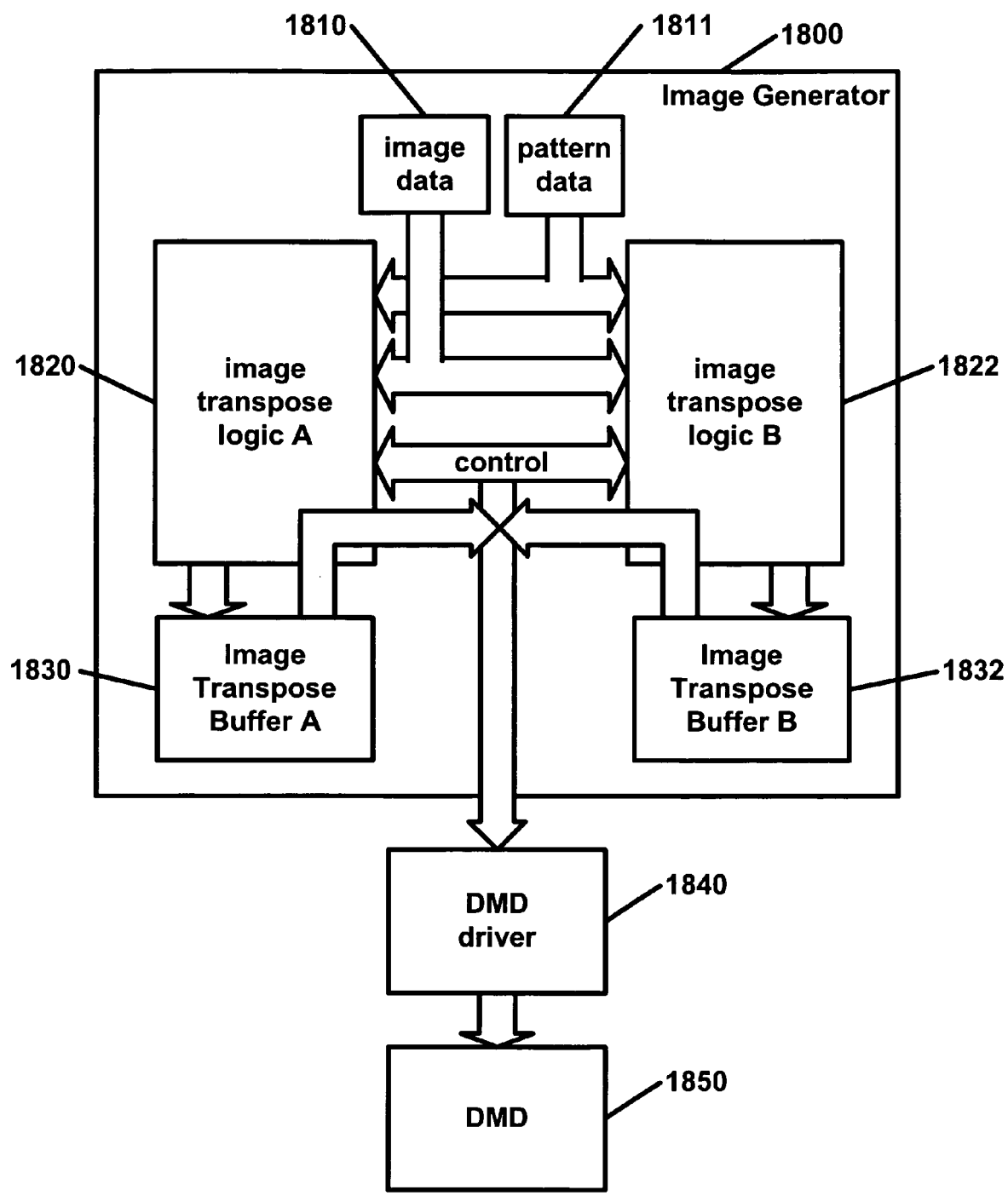
FIG. 18 is a block diagram of an aspect of the present invention showing a image generator with dual image transpose logic.

Because loading a DMD image may take a considerable amount of frame time, embodiments may use dual subframe display data to DMD pattern data converters. As illustrated in FIG. 18, the image data 1810 may be fed into either image transpose logic A 1820 and/or image transpose logic B 1822. One of the transpose logics may be a master and the other a slave. The master may decide which logic block will process each subsequent influx of image data 1810 and pattern data 1811. The output of image transpose logic A 1820 may be buffered by image transpose buffer A 1830 and like wise the output of image transpose logic B 1822 may be buffered by image transpose buffer B 1832. Under control of the master, one of the image transpose logics may present output subframes to the DMD driver 1840. The DMD driver 1840 may then drive the DMD 1850.

Figure 19:
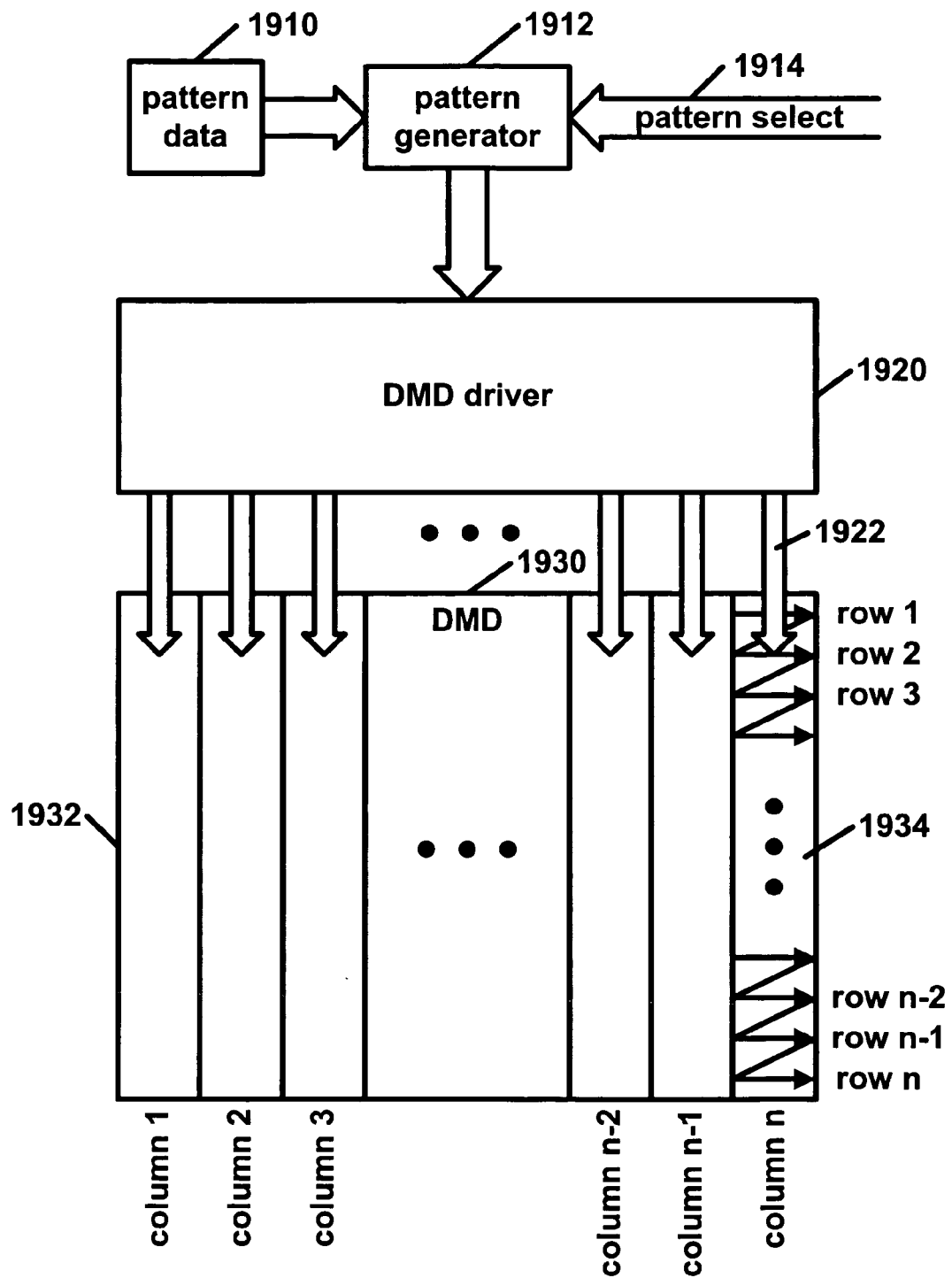
FIG. 19 is a block diagram of an aspect of the present invention showing pattern disruption generation.

FIG. 19 shows a pattern based disruption generator. In this embodiment, the input light beam to the DMD 1930 is modulated by the disruption pattern. For example, text or characters may be used to drive the DMD. Pattern data 1910 may specify to the pattern memory 1912, what characters to generate. A pattern selector 1914 may determine what pattern type will be used. The different types of patterns may produce different disruption effects. The output of the pattern generator 1912 may be output to a DMD driver 1920. The DMD driver 1920 may load the data into the DMD 1930 as a series of columized data 1922 where the DMD accepts data for colums 1 1932 through column n 1934. The data may load each column row by row as illustrated in column n 1934.

Figure 20:
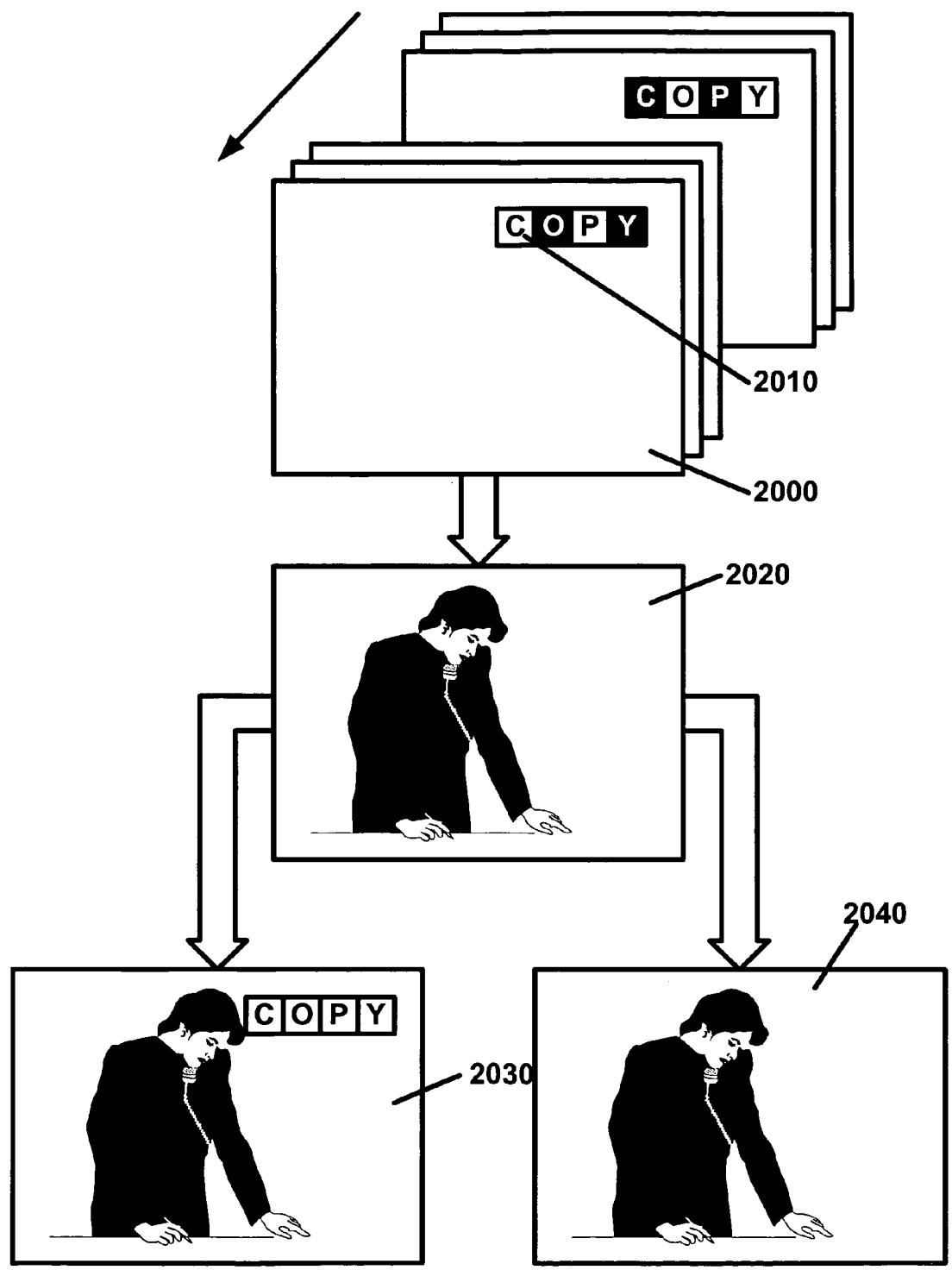
FIG. 20 is a diagram of an aspect of the present invention showing insertion of disruption text on an image.

FIG. 20 is a diagram of an aspect of the present invention showing insertion of disruption text on an image. A sequence of disruption frames 2000 may have character disruption text inserted in the frames per a pattern designed to cause disruptive effects. The frames may be projected through film 2020 containing content. A first resultant image 2030 is what an IRD might detect while a second resultant image 2040 is what a person might perceive.

Figure 21:
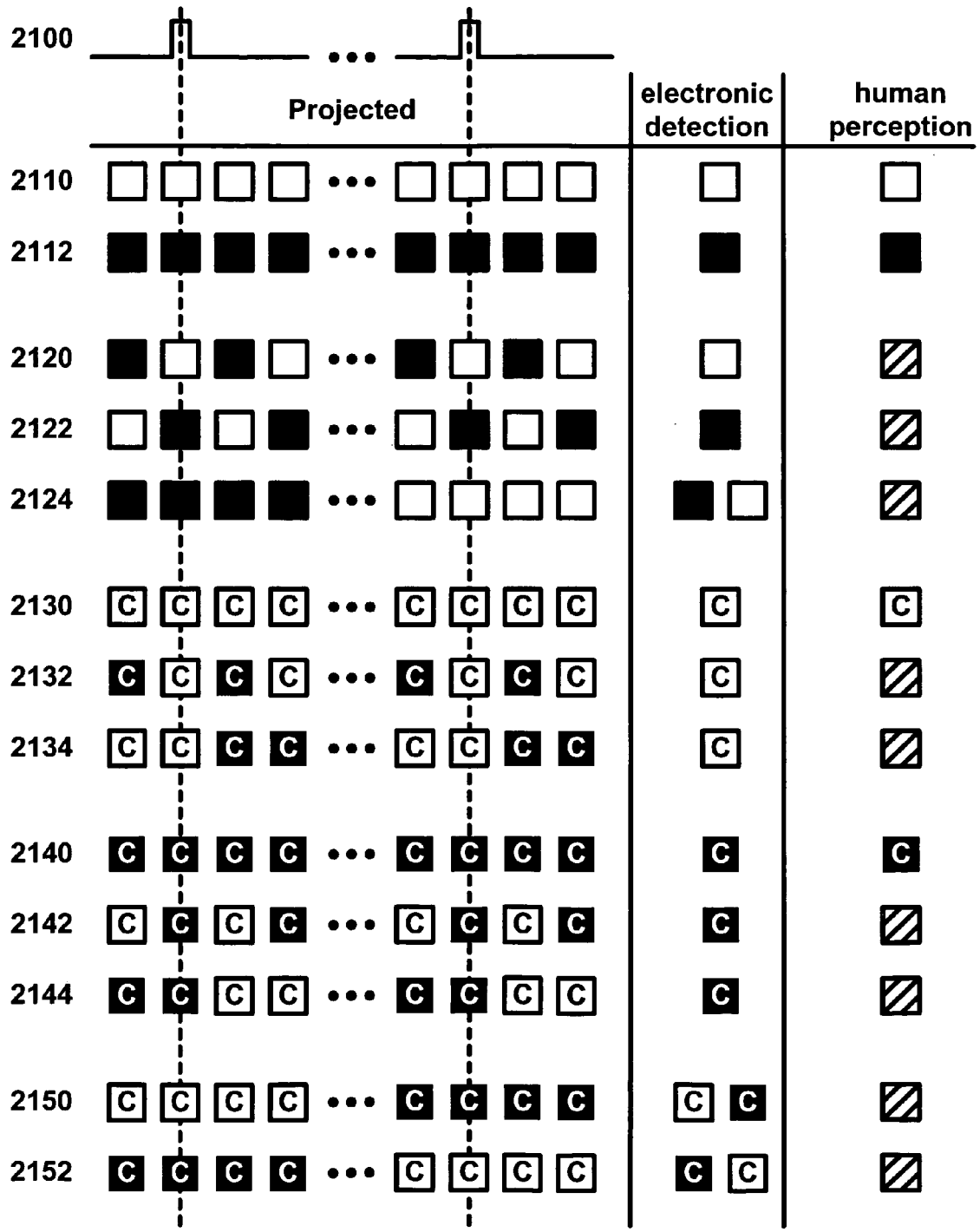
FIG. 21 is a diagram of an aspect of the present invention showing a multitude of font projection sequences.

FIG. 21 is a diagram of an aspect of the present invention showing a multitude of font projection sequences. Also illustrated in FIG. 21 are how an electronic device such as an IRD or digital camera and a human might detect or perceive different images. Sequences 2110, through 2124 show black and white block sequences. Sequence 2110 projects all white blocks. Both electronic detection and humans may perceive white. Sequence 2112 projects all black blocks. Both electronic detection and humans may perceive black. Sequences 2120, 2122, and 2124 show various 50 percent duty cycles of black and white blocks. In all of these cases, the human may perceive gray whereas the electronic devices may see either black or white as shown.

Sequences 2130 through 2152 show variations of 'C' and inverted 'C' characters. Again, in each case, the electronics will detect discrete characters, including sequences of characters such as seen in sequence 2150 and 2152. Where there are equal numbers of "C" and inverted "C" characters displayed at a rate faster than the human eye can perceive, the intensity of the foreground and background appear to be equal levels of gray and may not be distinguishable. Sequence 2130 projects all 'C' blocks and both electronic detection and humans may perceive 'C'. Sequence 2112 projects inverted 'C's. Both electronic detection and humans may see the inverted 'C'.

Figure 22:
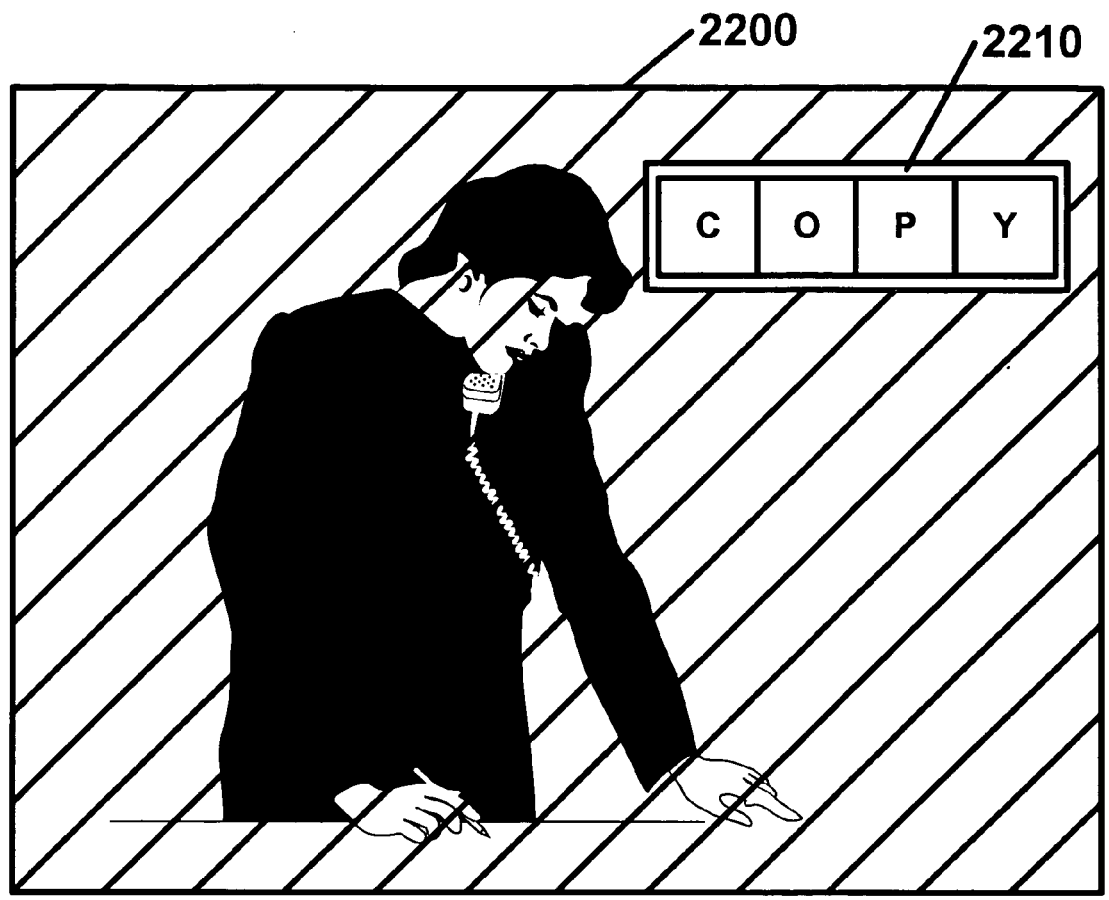
FIG. 22 is a block diagram of an aspect of the present invention showing an image disruption technique.

FIG. 22 illustrates a disruptive technique where a majority of a screen 2200 (shown in hatch) displays content at a different frame rate. A separate disruptive effect may be generated over a smaller zone of the screen 2210. This technique may take advantage of synchronization circuitry that some IRDs have. The synchronization circuitry allows IRDs to synchronize their shutters to external light sources such as artificial lighting or display screens. However, the synchronization circuitry may only synchronize to a single frequency. The IRD will preferably synchronize on the majority frame rate, thus enhancing targeted disruption in the smaller zone 2210.

Figure 23:
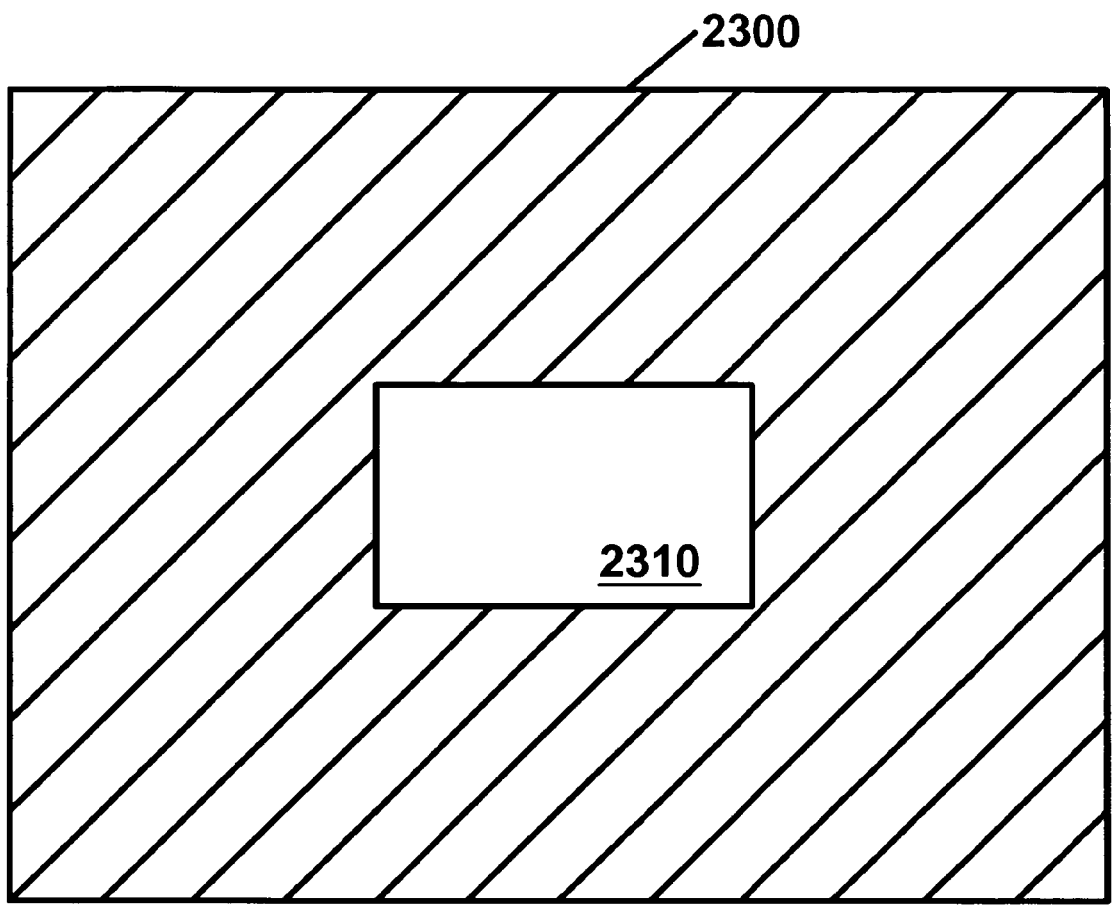
FIG. 23 illustrates a light switch array and a mirror combination wherein the light switch array occupies an area of the mirror.

FIG. 23 illustrates a light switch array 2310 and a mirror 2300 combination wherein the light switch array 2310 occupies an area of the mirror 2300. This effect allows disruption effects to target a particular area of an image. An advantage of this configuration is that it allows an effectively higher resolution attack over a smaller area using a light switch array 2310 than if the same light switch array 2310 were used to attack to whole image. Another advantage of this configuration, is that it may minimize the heat that a light switch array is likely to be subjected to. This configuration may be generated either by combining the mirror 2300 and the light switch array 2310 physically, or virtually by only steering array mirrors in an attack zone while leaving the other array mirrors idle.

It is possible to practice the present invention to provide varying degrees of disruption resolution. For example, one may create disruptive flashing effects by disrupting the image in whole. One may also create localized disruption effects by focusing the disruption effects on smaller areas or zones of the final image. The disruption zones may eventually become so small that the disruption zones reach or exceed the resolution of the original content. Using light arrays may create higher resolution disruptions. Light array technologies include LCD display devices, optical shutter devices, artificial eyelid devices and MEM's devices.

Figure 24:
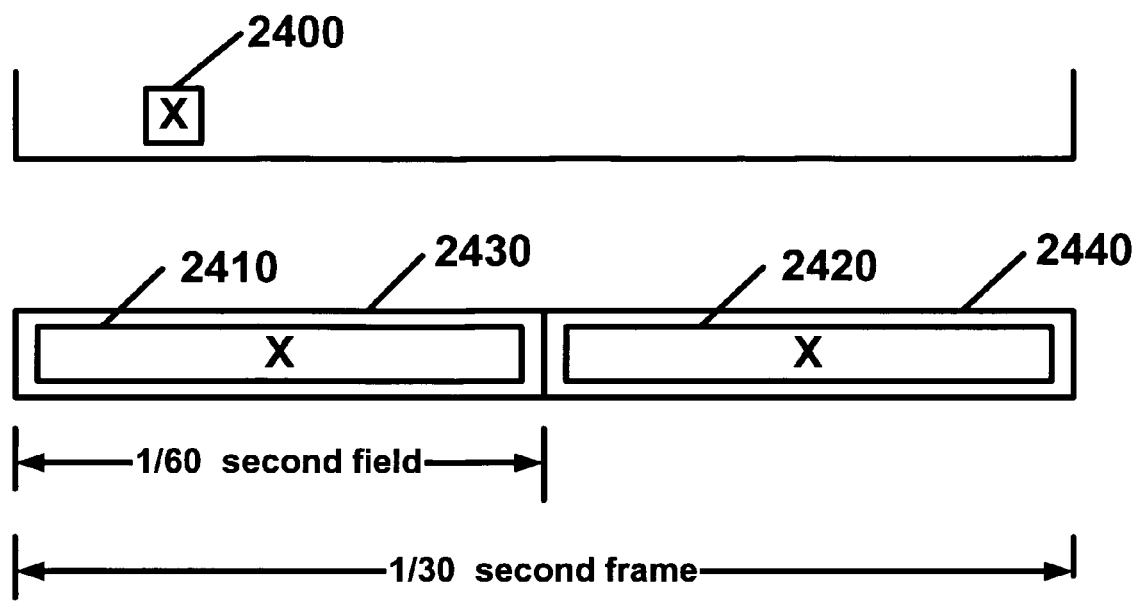
FIG. 24 shows an attack based upon the interlace processing on some IRDs.

FIG. 24 shows an attack based upon the interlace processing on some IRDs. Some video standards such as NTSC and PAL display images as two interlaced frames. A typical 1/30 second interlaced frame may comprise two 1/60 second fields. A first event 2400 may be captured once in a 1/30 second period but laid down in the recorded copy as a second event 2410 in a first 1/60 second field 2430 and a third event 2420 in a second 1/60 second field 2440. The result is that each single invisible short attack image generated may be displayed twice in a temporally stretched form preferably making that attack image visible when viewed through an IRD.

Although the present invention has been fully described by way of examples with reference to the accompanying drawings, it is to be noted that various changes and modifications will be apparent to those skilled in the art. For example, image generation has been multiply illustrated as being produced by projector systems. One skilled in the art will recognize that any image generation device with the proper timing may be used to create images as per the disclosed invention. Therefore, unless such changes and modifications depart from the scope of the present invention, they should be construed as being included therein.

We claim:

1. A method for visual copyright protection comprising the steps of:
    (a) inputting light from a light source;
    (b) selecting a disruptive light modulating pattern based upon a criterion, said criterion being how said pattern is perceived by an IRD and a human differently;
    (c) modulating a light array, having at least one element, using said disruptive light modulating pattern;
    (d) projecting said light onto said light array producing a modulated light beam; and
    (e) outputting said modulated light beam;
    wherein said disruptive light modulating pattern is selected from a set of predetermined disruptive light modulating patterns.

2. A method for visual copyright protection according to claim 1 wherein said light array comprises a multitude of light arrays.

3. A method for visual copyright protection according to claim 1 wherein said criterion further includes selecting said pattern for the purpose of inserting a watermark.

4. A method for visual copyright protection according to claim 1, wherein said criterion further includes selecting said pattern for the purpose of inserting a human perceivable image.

5. A method for visual copyright protection according to claim 1, wherein said criterion further includes selecting said pattern for the purpose of inserting a non-human perceivable image.

6. A method for visual copyright protection according to claim 1, wherein said criterion further includes selecting said pattern for the purpose of creating disruption effects.

7. A method for visual copyright protection according to claim 6, wherein said criterion further includes selecting said pattern for the purpose of creating disruption effects containing motion.

8. A method for visual copyright protection according to claim 1, further including the step of projecting said modulated light beam onto a surface.

9. A method for visual copyright protection according to claim 8, wherein said surface is an image bearing surface.

10. A method for visual copyright protection according to claim 8, wherein said modulated light beam is focused near said surface.

11. A method for visual copyright protection according to claim 8, wherein said surface is being utilized by a projector.

12. A method for visual copyright protection according to claim 8, wherein said modulated light beam illuminates an area.

13. A method for visual copyright protection according to claim 1, wherein said disruptive light modulating patterns can modulate each element differently.

14. A method for visual copyright protection according to claim 1, further including the step of inputting said criterion from an external source.

15. A method for visual copyright protection according to claim 1, further including the step of inputting said disruptive light modulating pattern from an external source.

16. A method for visual copyright protection according to claim 1, wherein said disruptive light modulating pattern interlaces disruptive content with nondisruptive content, said disruptive content being interlaced at a rate too fast for a human to perceive.

17. A method for visual copyright protection according to claim 1, wherein said disruptive light modulating pattern is a multitude of disruptive light modulating patterns.

18. A method for visual copyright protection according to claim 17, wherein each of said multitude of disruptive light modulating patterns modulates at least one of said elements.

19. A method for visual copyright protection according to claim 18, wherein each of said multitude of disruptive light modulating patterns modulates at least one of said elements in an array of elements to generate a disruptive effect.

20. A method for visual copyright protection according to claim 1, further including the steps of:
    (a) receiving an input image; and
    (b) combining said input image with said disruptive light modulating pattern.

21. A method for visual copyright protection according to claim 1, wherein said disruptive light modulating pattern is a multitude of sequenced disruptive light modulating patterns.

22. A method for visual copyright protection according to claim 1, wherein said criterion is based upon a dynamic analysis of source content.

23. A method for visual copyright protection comprising the steps of:
    (a) inputting light from a light source;
    (b) splitting said light;
    (c) selecting a disruptive light modulating pattern based upon a criterion, said criterion being how said pattern is perceived by an IRD and a human differently;
    (d) modulating a light array, having at least one element, using said disruptive light modulating pattern;
    (e) projecting said light onto said light array producing a modulated light beam; and
    (f) outputting said modulated light beam.

24. An apparatus for visual copyright protection comprising:

(a) a light source capable of producing light;
(b) a light array, having at least one element, capable of acting on the light to produce a modulated light beam;
(c) a light array controller for modulating said light array using at least one disruptive light pattern; and
(d) a disruption processor for producing said at least one disruptive light pattern based upon a criterion, said criterion being how said pattern is perceived by an IRD and a human differently; wherein:
(a) said disruption processor generates at least one disruption effect selected from the group consisting of:
  (i) a visible disruption effect;
  (ii) IRD command signals;
  (iii) an autofocus disruptive effect;
  (iv) moving disruption effects;
  (v) an exposure disruptive effect; and
  (vi) Moiré disruptive effects; and
(b) said disruption effect is a multitude of said disruption effects.

25. The apparatus according to claim 24, further including input content.

26. The apparatus according to claim 25, wherein said input content is analog data.

27. The apparatus according to claim 25, wherein said input content is digital data.

28. The apparatus according to claim 24, wherein said disruption processor further includes disruption data.

29. The apparatus according to claim 24, wherein said disruption processor operates on at least one image element.

30. The apparatus according to claim 29, wherein at least one of said image elements is a pixel.

31. The apparatus according to claim 29, wherein at least one of said image elements is a group of pixels.

32. The apparatus according to claim 29, wherein at least one of said image elements is an image frame.

33. The apparatus according to claim 24, wherein said disruption processor is a primary disruption processor and said primary disruption processor further includes a multitude of supporting disruption processors.

34. The apparatus according to claim 24, wherein said light array has a characteristic from the group consisting of:
  (a) reflective; and
  (b) translucent.

35. The apparatus according to claim 24, wherein said light array is selected from the group consisting of:
  (a) a liquid crystal display;
  (b) MEMS DMD;
  (c) I-DLA;
  (d) a cathode ray tube; and
  (e) a retinal display.

36. The apparatus according to claim 24, wherein said disruption processor introduces a disruption watermark component.

37. The apparatus according to claim 24, wherein said disruption processor introduces a disruption frequency component.

38. The apparatus according to claim 37, wherein said disruption frequency component is a multitude of disruption frequency components.

39. The apparatus according to claim 24, wherein said multitude of disruption effects are varied temporally.

40. The apparatus according to claim 24, wherein said multitude of disruption effects are varied spatially.

41. The apparatus according to claim 24, wherein said disruption processor inserts new disruptive content.

42. The apparatus according to claim 41, wherein said new disruptive content includes at least one pattern selected from the group consisting of:
  (a) a dark color;
  (b) a random pattern;
  (c) a logo;
  (d) a copyright notice;
  (e) a spot;
  (f) geometric shape; and
  (g) characters.

43. The apparatus according to claim 24, further including a security interlock.

44. A method for visual copyright protection comprising the steps of:
  (a) inputting light from a light source;
  (b) selecting a disruptive light modulating spatial pattern based upon a criterion, said criterion being how said pattern is perceived by an IRD and a human differently;
  (c) spatially modulating a light array, having at least one element, using said disruptive light modulating spatial pattern;
  (d) projecting said light onto said light array producing a spatially modulated light beam; and
  (e) outputting said spatially modulated light beam.

45. An apparatus for visual copyright protection comprising:
  (a) a light source capable of producing light;
  (b) a light array, having at least one element, capable of acting on the light to produce a spatially modulated light beam;
  (c) a light array controller for spatially modulating said light array using at least one disruptive light spatial pattern; and
  (d) a disruption processor for producing said at least one disruptive light spatial pattern based upon a criterion, said criterion being how said pattern is perceived by an IRD and a human differently.

* * * * *